(12) United States Patent
Dokyu et al.

(10) Patent No.: US 6,688,201 B1
(45) Date of Patent: Feb. 10, 2004

(54) THIN SHEET PUNCHING DEVICE

(75) Inventors: Tensaburo Dokyu, Hirakata (JP);
Mikio Majima, Neyagawa (JP);
Saburo Nakatsuka, Kyoto (JP);
Takanori Kuse, Neyagawa (JP); Akio Shizuno, Omihachiman (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 107 days.

(21) Appl. No.: 10/069,440

(22) PCT Filed: Aug. 11, 2000

(86) PCT No.: PCT/JP00/05428

§ 371 (c)(1),
(2), (4) Date: Feb. 14, 2002

(87) PCT Pub. No.: WO01/14079

PCT Pub. Date: Mar. 1, 2001

(30) Foreign Application Priority Data

Aug. 25, 1999 (JP) ............................................. 11-238835

(51) Int. Cl.[7] ................................................ B21D 28/06
(52) U.S. Cl. ..................... 83/206; 83/219; 83/435.15; 83/687; 83/691
(58) Field of Search ........................ 83/687, 691, 206, 83/213, 214, 219, 220, 255, 257, 277, 84, 86, 90, 109, 151, 152, 155, 402, 405, 435.15, 435.17, 41, 43; 414/796.5, 797; 271/18.1, 234

(56) References Cited

U.S. PATENT DOCUMENTS

| | | | | |
|---|---|---|---|---|
| 2,489,583 A | * | 11/1949 | Messenger | ...................... 83/50 |
| 2,600,834 A | * | 6/1952 | Blair | ............................... 83/43 |
| 2,858,884 A | * | 11/1958 | Duffield | ......................... 83/43 |
| 3,830,121 A | * | 8/1974 | Makeev et al. | ................ 83/206 |
| 3,880,034 A | * | 4/1975 | Sapolsky | ...................... 83/220 |
| 4,506,574 A | * | 3/1985 | Yamashita | .................... 83/219 |
| 4,709,605 A | * | 12/1987 | Clark | ........................... 83/405 |
| 5,019,314 A | * | 5/1991 | Burlando | ..................... 264/156 |
| 5,400,652 A | * | 3/1995 | Haar | ............................ 83/206 |
| 5,622,068 A | | 4/1997 | Sjoeberg | |
| 5,878,640 A | | 3/1999 | Haar | |
| 6,228,530 B1 | * | 5/2001 | Dokyu et al. | ................ 429/168 |

FOREIGN PATENT DOCUMENTS

| | | |
|---|---|---|
| DE | 19643232 | 4/1998 |
| JP | 01-130825 | 5/1989 |
| JP | 07-073765 | 3/1995 |
| WO | 99-12218 | 3/1999 |

* cited by examiner

Primary Examiner—Allan N. Shoap
Assistant Examiner—Stephen Choi
(74) Attorney, Agent, or Firm—Jordan and Hamburg LLP

(57) ABSTRACT

After a large thin sheet (17) has been gripped in a registered state by a plurality of chuck tools (21) and transported in the X direction to a control start position, Y direction movement control for moving the sheet reciprocally by a prescribed movement pitch in the Y direction which is perpendicular to the X direction, and X direction movement control for moving the sheet by a prescribed movement pitch in the X direction each time it has been moved in either Y direction, are repeated in alternate fashion, and every other punching location (18) of a plurality of punching locations in the Y direction on the large thin sheet (17) are successively registered in position with respect to punching tools (23) and the plurality of alternate punching locations (18) in the Y direction of the large thin sheet (17) are then punched out simultaneously.

14 Claims, 21 Drawing Sheets

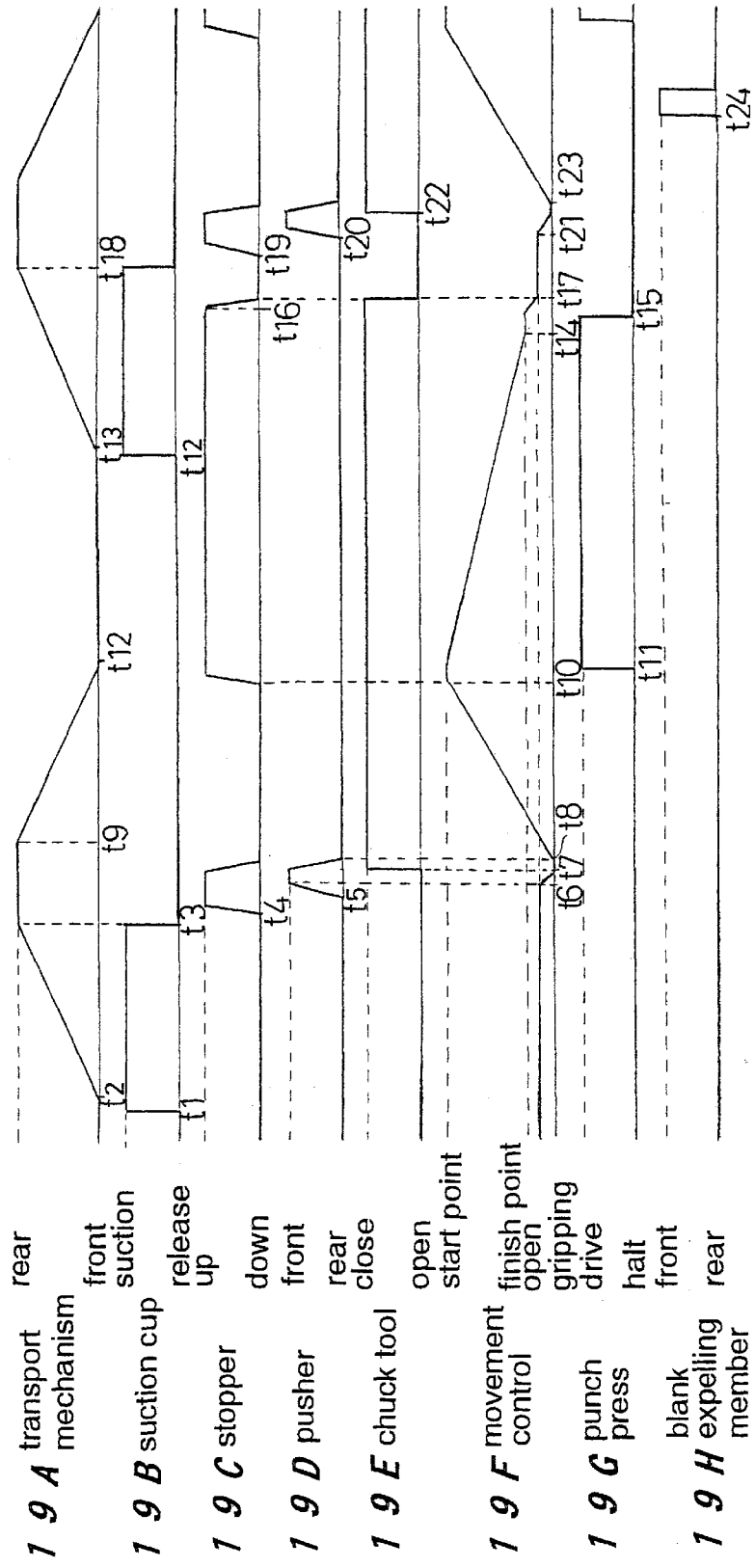

Prior Art
Fig. 20A
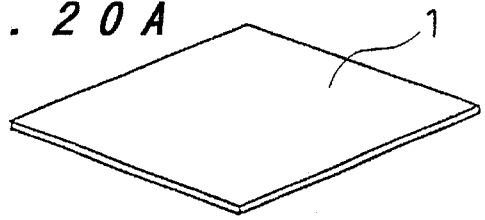
Fig. 20B
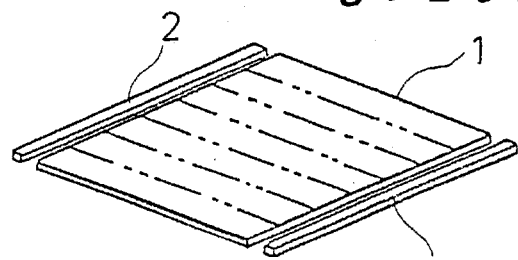
Fig. 20C
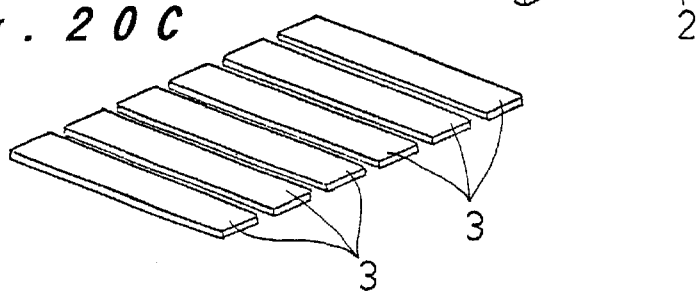
Fig. 20D
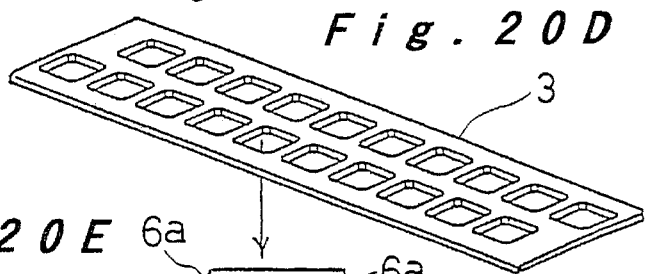
Fig. 20E
Fig. 20F
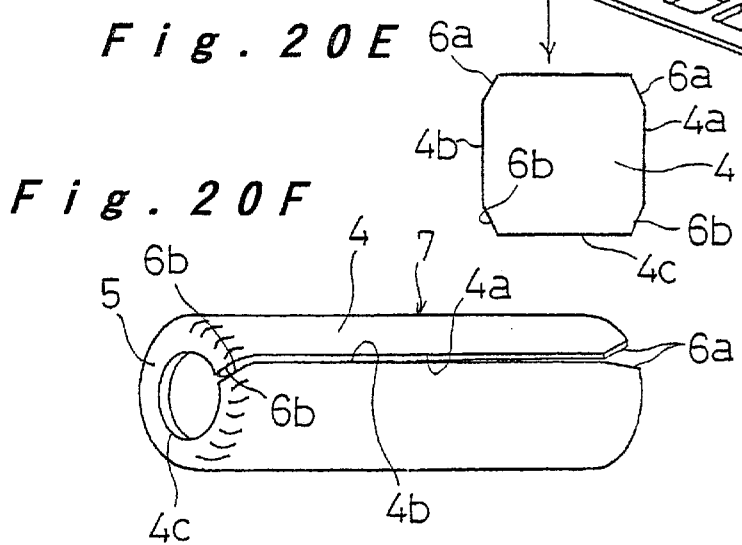

Prior Art

THIN SHEET PUNCHING DEVICE

TECHNICAL FIELD

The present invention relates to a thin sheet punching device for obtaining a plurality of small pieces of similar shape corresponding to the punching hole of a press punching die, by processing a thin sheet of raw material of relatively large size by means of punching tools of a punch press machine.

BACKGROUND ART

Conventionally, the metal outer jacket of a battery is fabricated by the steps illustrated in FIGS. 20A–20F. Firstly, as shown in FIG. 20A, a hoop material made from tinplate steel sheet and having a thickness of approximately 0.2 mm is cut to prescribed dimensions to obtain a square-shaped raw material sheet 1 having a relatively large size, for example, 785 mm×850 mm. Thereupon, as shown in FIG. 20B, slits parallel to the edges are formed in the side edge regions, each approximately 2 mm from two mutually opposing side edges of the raw material sheet 1. These two side regions 2 are removed, whereupon slits are formed at prescribed intervals between the two end edges of the sheet, as illustrated by the double-dotted lines. Thereupon, as illustrated in FIG. 20C, the raw material sheet 1 is divided into a prescribed number of strip-shaped intermediate sheets 3. These intermediate sheets 3 are then respectively punch processed using prescribed press punching tools, as shown in FIG. 20D, thereby yielding a plurality of jacket blank sheets 4 like that shown in FIG. 20E.

The aforementioned jacket blank 4 is then bent into a cylindrical shape, as shown in FIG. 20F, the opposing side edges 4a, 4b thereof are butted against each other, and a base section 5 is formed by curl caulking the edge region of the lower side 4c towards the inside, thereby forming an outer jacket for a battery 7 approximately having a bottomed cylinder shape. The reason that the aforementioned raw material sheet 1 is divided into a plurality of intermediate sheets 3 by means of a slitter is because, in order to achieve mass production jacket blanks 4 having small cutaways 6a, 6b respectively at the four corners thereof, in such a manner that there is no variation in the shape of the aforementioned cutaways 6a, 6b, it is difficult to adopt any means other than punch pressing wherein a plurality of jacket blanks 4 are punched out simultaneously from an intermediate sheet 3.

However, in the method for manufacturing the aforementioned outer jacket 7 for a battery, as FIG. 20D clearly demonstrates, a very large amount of raw material waste is left after the strip-shaped intermediate sheets 3 have been punch pressed, and hence material loss is high. Accordingly, the number of jacket blank sheets 4 obtained from a single intermediate sheet 3 is reduced, and therefore productivity is low. Production numbers for small-scale batteries have been extremely high in recent years, and therefore the material loss described above leads to enormous economic losses, and is also undesirable from the viewpoint of preserving resources.

In order to resolve problems such as the foregoing, the applicants of the present invention have proposed a method for manufacturing metal outer jackets for batteries by means of the processes described below (see International Laid-Open Patent No. WO99/12218). FIGS. 21A–21F illustrate the sequence of manufacturing steps. Firstly, a hoop material made from tinplate steel sheet of approximately 0.2 mm thickness is cut to prescribed dimensions, to obtain a square-shaped raw material sheet 1 similar to that illustrated in FIG. 20A. Slits are then formed in this raw material sheet 1 running along the cutting lines indicated by the parallel double-dotted lines in the diagram, thereby dividing the raw material sheet 1 into two edge sections 8 of approximately 2 mm width from opposing ends of the sheet 1, and a prescribed number of strip-shaped first intermediate sheets 9 cut in parallel with these edge sections 8.

Thereupon, as shown in FIG. 21C, the two edge regions of each first intermediate sheet 9 in the longitudinal direction thereof are removed by forming further slits, and a plurality of rectangular second intermediate sheets 10 are obtained by forming slits along a plurality of parallel cutting lines running perpendicularly to the longitudinal direction of the first intermediate sheet 9. The longitudinal dimension of these second intermediate sheets 10 is set approximately 1 mm longer than the length of two jacket blanks 11, which are the objects to be fabricated, laid end to end. Moreover, as shown in FIG. 21D, the central portion of each of the aforementioned second intermediate sheets 10 in the longitudinal direction thereof is then cut perpendicularly to said longitudinal direction by a press cutting tool 12 having an approximately I-shaped cross-section, thereby dividing it into two jacket blank sheets 11, as illustrated in FIG. 21E. These jacket blanks 11 are formed with two cutaways 13a, 13b on the upper and lower ends of one side edge 11a only, these cutaways 13a, 13b having a width respectively twice the size of the two cutaways 6a, 6b formed at the four corners of the jacket blanks 4 in FIG. 20E. The jacket blank 11 is then bent into a cylindrical shape, as shown in FIG. 21F, the two side edges 11a, 11b thereof being butted against each other, and the edge region of the lower side 11c thereof is then curl caulked towards the inside, thereby yielding an outer jacket for a battery approximately having a bottomed cylinder shape.

In the manufacturing method for an outer jacket 14 described above, instead of means for obtaining jacket blanks 4 by press punching a strip-shaped intermediate sheet 3 as illustrated in FIGS. 20A–20F, jacket blanks 11 are obtained by respectively press cutting second intermediate sheets 10 formed by dividing a strip-shaped first intermediate strip 9 into a plurality of sheets. Compared to the method for manufacturing the outer jacket 7 in FIGS. 20A–20F, the raw material remainder created after forming the jacket blanks 11 is significantly reduced to approximately ¼. Since the number of jacket blanks 11 that can be obtained from the same raw material sheet 1 increases in accordance with the decrease in raw material remainder, it is possible to obtain an excellent merit in that the material yield rate increases dramatically.

However, whilst the method for manufacturing an outer jacket 14 described above brings the aforementioned excellent merit, it stills leaves scope for further improvement. Specifically, the method for manufacturing an outer jacket 14 described above comprises a cutting step performed by a slitter device on a raw material sheet 1, a cutting step performed by a slitter on respective first intermediate sheets 9, and a press cutting step performed by a press tool 12 on respective second intermediate sheets 10, and therefore, since the number of manufacturing steps is relatively large in this way, a problem exists in that further improvements in productivity cannot be achieved.

Furthermore, although the material waste created after forming the jacket blanks 11 is reduced significantly in comparison with the method for manufacturing an outer jacket 7 illustrated in FIGS. 20A–20F, it cannot be regarded as being sufficiently reduced. In other words, the press tool 12 for dividing the second intermediate sheets 10 into two jacket blanks 11 by press cutting comprises a slit-forming cutting section 12a for forming the cutting line portion, as illustrated in FIG. 21D, and approximately triangular cutaway-forming cutting sections 12b, 12c provided at either end portion of this slit-forming cutting section 12a, but in order that the second intermediate sheets 10 are press cut smoothly to obtain jacket blanks 11 of the correct shape, it is necessary to set the width of the slit-forming cutting section 12a to approximately 1 mm at the minimum. Moreover, it is also necessary to set the cutaway-forming cutting sections 12b, 12c to a dimension equalling double the length of the cutaway widths of the cutaways 13a, 13b to be formed, plus the 1 mm width of the slit-forming cutting section 12a. Therefore, a considerable amount of material waste is created after press cutting of the second intermediate sheets 10. This production of material waste leads to relatively large economic losses, since the number of small-scale batteries currently being produced is very high indeed.

Besides the method for manufacturing an outer jacket described above, there has also been proposed means for obtaining a large number of small pieces, such as the aforementioned jacket blanks, by punch processing of works, such as a thin raw material sheet of relatively large size (see, for example, Japanese Patent Publication No.(Hei) 7-73765 and Japanese Patent Application Laid-open No. (Hei) 1-130825). The device disclosed in Japanese Patent Publication No.(Hei)7-73765 is provided with an X–Y table having a composition which integrates a carriage base, a front side table, and a transport table. A work held by a clamper in this X–Y table is moved in the directions of the X axis and Y axis by means of the X–Y table, prescribed locations which are to be punched out being registered in position between a punch and a die, whereupon punch processing is performed, and small pieces being cut out by combined operation of a punch and die in a cutting out section located to the side of the punch processing section. In the device disclosed in Japanese Patent Application Laid-open No.(Hei) 1-130825, on the other hand, a work on a table is held and fixed in a prescribed position by two work holders, and a punching tool is registered in position by moving in the X axis and Y axis directions, whereupon punch processing is performed on the work.

Conventional devices for punch processing of works are composed in such a manner that either a work is registered in position by controlling the movement of an X–Y table, or a punching tool is registered in position corresponding to a punching location on a work, by moving the tool respectively in the X axis and Y axis directions. Therefore, although it is possible to cut out jacket blanks of small size having cutaways as described above, from a thin raw material sheet of relatively large size, whilst controlling the shape thereof accurately, it is not possible to punch out such blanks at a good productivity rate, whilst reducing the material waste as far as possible.

The present invention was devised in view of the foregoing problems in the prior art, an object thereof being to provide a thin sheet punching device which is capable of performing punch processing with good productivity by means of simplified manufacturing steps, whilst reducing material waste to a minimum, when obtaining a plurality of small pieces forming blanks for the outer jackets of batteries, for example, from a thin raw material sheet of relatively large size.

DISCLOSURE OF THE INVENTION

In order to achieve the aforementioned object, the thin sheet punching device according to the present invention comprises the following elements. A thin sheet transporting mechanism transports rectangular large thin sheets of prescribed dimensions, one at a time, and loads same onto a material supply/position registering area. A thin sheet positioning mechanism registers the large thin sheet on the material supply/position registering area by moving same linearly by pressing two adjacent edges thereof in mutually perpendicular directions by means of a pair of pushers, whilst pressing the two opposing edges of the large thin sheet against a pair of reference position stopper members. After the rear edge portion of the large thin sheet in a registered state has been gripped by a plurality of chuck tools and the registration of the large thin sheet by the thin sheet positioning mechanism has been released, a thin sheet movement control mechanism transports the large thin sheet in an X direction to a control start position. Thereupon, it alternately performs Y direction movement control for moving the sheet reciprocally by a prescribed movement pitch in a Y direction which is perpendicular to the X direction, and X direction movement control for moving the sheet by a prescribed movement pitch in the X direction each time it has been moved in either Y direction, thereby controlling the movement of said large thin sheet in such a manner that a plurality of alternate punching locations of a plurality of punching locations set in a row in the Y direction of the large thin sheet are successively registered in processing positions. A punch press machine provided with a plurality of press punching tools, each comprising a die and a punch, aligned in the Y direction at the processing position, is driven each time the thin sheet movement control mechanism performs movement control in either the X direction or the Y direction, thereby simultaneously punching out the plurality of alternate punching locations in the Y direction of the large thin sheet.

In this thin sheet punching device, in contrast to a conventional method, it is not necessary to provide cutting steps performed by a slitter. Small pieces for forming blanks for the outer jackets of batteries can be obtained simply by performing a continuous series of punching steps, wherein a large thin sheet is gripped by chuck tools, and moved and controlled alternately in the X direction and the Y direction, whereby a plurality of punching locations are simultaneously positioned at respective punching tools of a punch press machine and then punched out. The manufacturing process is thus remarkably simplified. Moreover, since a plurality of small pieces can be punched out simultaneously by a single operation of the punch press machine, productivity is dramatically improved.

Since the chuck tools grip the large thin sheet when it is in a registered position, they are capable of gripping the large thin sheet accurately in prescribed positions. Furthermore, since a plurality of alternate punching locations in a single row of aligned punching locations on the large thin sheet are punched out simultaneously, the punch margin in the large thin sheet, which is pressed by the stripper of the punch press machine, is only subjected to a pulling force in one direction, despite the fact that a plurality of small pieces are being punched out simultaneously. Therefore, the punch margin can be set to a small width, and the material waste remaining after the punching of the large thin sheet has been completed is significantly reduced in comparison to a conventional method. In particular, when obtaining small pieces forming blanks for the outer jackets of batteries, a very great economic advantage is obtained by significantly reducing material wastage, since the current production numbers for small-scale batteries are extremely high.

The plurality of chuck tools in the aforementioned invention each comprise a fixed jaw section formed with an engaging projection protruding from the chuck surface, and a movable jaw section having a sharp toothed section formed at the front end portion of a cylindrical shape capable of containing the engaging projection therein. The movable jaw section is provided in such a manner that it can be moved reciprocally with respect to the fixed jaw section, and the chuck tools are constituted in such a manner that a portion of the large thin sheet inserted between the jaw sections is caused to undergo plastic deformation into a shape corresponding to that of the engaging projection by means of pressure imparted by the toothed section, whilst the region surrounding this deformed portion is held between the toothed section and the chuck surface.

Although the large thin sheet is of relatively large size and heavy weight, the chuck tools grip it in a securely held state which does not allow the sheet to deviate from its gripping position, even when the large thin sheet is moved and controlled at high speed. Therefore, in accordance with the precisely controlled movement of the chuck tools, it is possible to register the large thin sheet in position extremely accurately with respect to the punching tools of the punch press machine, and therefore the width of the punch margin can be reduced.

In the thin sheet punching device comprising the aforementioned chuck tools, desirably, the thin sheet movement control mechanism comprises a program-controlled X direction movement control servo motor and Y direction movement control servo motor.

Since the servo motors can be rotated and controlled with high precision by program control implemented by a controller, a thin sheet movement control mechanism mounted with these servo motors is able to control the movement of the chuck tools gripping the large thin sheet by extremely accurate movement pitches in the X direction and Y direction, respectively, in contrast to cases where the large thin sheet is moved and controlled by operating the chuck tools or an X–Y table, or the like, by means of an air cylinder, or other such driving means. Therefore, in addition to the chuck tools gripping the large thin sheet in a very secure manner, it is also possible to register the large thin sheet in position with great accuracy, with respect to the punching tools of the punch press machine. Therefore, it is possible to punch out along the outer shape of the print patterns, that have previously been formed at punching locations on the large thin sheet, with good accuracy. Moreover, since the chuck tools grip the large thin sheet when it has been registered accurately by means of the thin sheet positioning mechanism, it is not necessary to provide gripping reference holes, or the like, for the large thin sheet.

In a thin sheet punching device provided with the aforementioned chuck tools and thin sheet movement control mechanism, a punch margin having a width of 1.0 mm–0.4 mm is set respectively between each pair of adjacent punching locations on the large thin sheet.

Since the large thin sheet can be gripped very securely by the chuck tools and these chuck tools can be moved and controlled with high precision in the X direction and Y direction by the servo motors, thereby registering them accurately in position, it is possible to set the smallest possible width for the punch margin, and hence the material waste after punching of the large thin sheet is greatly reduced and the material yield rate is dramatically improved.

In the inventions described above, desirably, the thin sheet punching device further comprises a thin sheet setting table on which a plurality of large thin sheets are loaded in a stacked fashion. The thin sheet transporting mechanism is provided with a plurality of suction cups for successively picking up only the uppermost sheet of the plurality of large thin sheets on the thin sheet setting table, and for transporting same to a material supply/position registering area. Meanwhile, the punch press machine is engaged in punch processing a large thin sheet. The thin sheet setting table comprises a plurality of free-moving balls provided in a rotatable fashion, and a thin sheet receiving plate provided movably on the free-moving balls, which moves reciprocally between a large thin sheet setting position and a suction position confronting the thin sheet transporting mechanism.

Although the total weight of a plurality of stacked large thin sheets is relatively heavy, since the thin sheet receiving plate onto which these large thin sheets have been loaded moves extremely smoothly by means of the rotation of the free-moving balls, it is possible for the sheets to be registered accurately in a suction position confronting the thin sheet transporting mechanism simply by being pushed lightly by an operator, for example. Moreover, since the large thin sheets are positioned accurately by means of the thin sheet positioning mechanism when they are transported to the material supply/position registering area by the thin sheet transporting mechanism, it is simply necessary from them to make contact with the thin sheet transporting mechanism. Consequently, in this thin sheet punching device, the operation of setting a plurality of large thin sheets in a stacked state can be achieved very readily and swiftly, by means of a simple structure.

In the aforementioned inventions, the first reference position stopper member for restricting the position of the rear edge of a large thin sheet opposing the thin sheet movement control mechanism comprises the following elements. A position restricting face thereof confronts the rear edge of the large thin sheet when the member has been raised from a retracted position to an upper registration reference position. A guide face thereof, formed on the opposite side to the position restricting face, slides against material waste generated after the large thin sheet has been punch processed as the large thin sheet is moved in the X direction by the thin sheet movement control mechanism, thereby guiding same into a waste recovery area. Moreover, desirably, the first reference position stopper member is composed in such a manner that it is located in the registration reference position when the large thin sheet is being registered in the material supply/position registering area, and when the large thin sheet is being punch processed by the punch press machine.

By adopting this composition, it is possible to invest the first reference position stopper member with the dual functions of restricting the position of the large thin sheet and guiding the material waste into the waste recovery area. Therefore, when the first reference position stopper members are located in the registration reference position, at the same time that the material waste is guided into the waste recovery area by the guide face whilst the large thin sheet is punch processed by the punch press machine, a large thin sheet can also be transported to the material supply/position registering area by the thin sheet transporting mechanism, and that large thin sheet can be registered in position. Therefore, immediately after punch processing has been completed, this registered large thin sheet can be gripped by the chuck tools and transported to the control start position, thereby further enhancing the efficiency of the punching steps for the large thin sheets.

In the aforementioned inventions, each of the plurality of dies in the punch press machine has a similar shape wherein a punching hole having a shape corresponding to the small pieces to be punched out is formed in the central region thereof and an L-shaped cutaway step section and a linear-shaped cutaway step section are formed respectively on either side of the punching hole. The dies are each affixed to a die holder in the same installation configuration, and escape grooves permitting the chuck tools to move by a prescribed movement pitch in the Y direction at the final punching position of the large thin sheet and transit grooves permitting the chuck tools to pass by in the X direction are constituted by integrating the L-shaped cutaway step section of one die with the linear-shaped cutaway section of the other die in each pair of adjacent dies respectively opposing the positions of the chuck tools, in such a manner that they are mutually connecting.

Since the chuck tools can enter into the escape grooves formed between two adjacent dies when they advance to the final punching position of the large thin sheet, it is possible to reduce the width of the clamping margin on the large thin sheet where it is gripped by the chuck tools, by a corresponding amount, and hence the amount of waste material remaining after the large thin sheet has been punch processed can be further reduced. Moreover, by forming all the dies with the same shape, it becomes unnecessary to prepare a large number of spare parts, and hence management of components is facilitated. Furthermore, since the dies are all the same shape and are interchangeable, when they are all removed as a block for regrinding and then reinstalled, it is not necessary to specify the installation position for each die. Therefore, installation of the dies can be performed readily and swiftly, and maintenance characteristics are dramatically improved.

Desirably, the thin sheet movement control mechanism in the aforementioned inventions performs movement control of the large thin sheets in the following manner. Firstly, when a large thin sheet in a registered state in the material supply/position registering area is transported in the X direction whilst being gripped by the chuck tools, the large thin sheet is halted in a control start position wherein alternate punching locations in the first row in the Y direction of the large thin sheet are registered in positions opposing punching tools. The large thin sheet is then moved and controlled in the Y direction and X direction from the control start position until a final punching position where the chuck tools enter inside the escape grooves of the dies. When the chuck tools are advanced to a release position having passed fully through the transit grooves of the dies, the material waste generated when punching of the large thin sheet has been completed is released by opening the chuck tools, whereupon the chuck tools advance further from the release position to a gripping position, where a large thin sheet registered in position on the material supply/position registering area is gripped by the chuck tools.

Since the chuck tools are controlled in such a manner that they do not make any unnecessary movements in the X direction, it is possible further to enhance the efficiency of the large thin sheet punching steps.

In the aforementioned inventions, desirably, the thin sheet punching device further comprises a small piece transporting and aligning mechanism for transporting small pieces punched out from a large thin sheet by the punch press machine and stacking same in an aligned state. The small piece transporting and aligning mechanism comprises the following elements: An output magnetic conveyor outputs small pieces which drop down after being punched out by the punch press machine, to the exterior of the punch press machine, whilst maintaining the positions thereof after punching. A stacking magnetic conveyor guides small pieces discharged from the end of the path of the magnetic conveyor in an upward vertical direction and then transports same in a downward vertical direction, the small pieces being held magnetically in a virtually perpendicular position with respect to the surface of the conveyor. A small piece receiving plate is positioned in the vicinity of the magnetic conveyor, and acts to prevent the conveyance of the small pieces and to stack them on each other. A small piece expelling member expels a prescribed number of small pieces stacked up on the small piece receiving plate, to the exterior of the small piece receiving plate.

By adopting this composition, small pieces produced by punch processing of a large thin sheet can be obtained in an aligned, stacked and correctly orientated state, in a number corresponding to a single large thin sheet, thereby greatly facilitating the processing steps in subsequent stages.

An intermediate magnetic conveyor can be positioned between the output magnetic conveyor and the stacking magnetic conveyor in the small piece transporting and aligning mechanism. This intermediate magnetic conveyor is inclined to a prescribed angle with respect to the horizontal plane, in a perpendicular direction to the direction of transport, and a pair of guide sections are provided on either side of the stacking magnetic conveyor, an interval smaller than the width of the small pieces in the perpendicular direction to their direction of transport being allowed between the guide sections.

Thereby, when the small pieces held magnetically onto the stacking magnetic conveyor at a virtually perpendicular position thereto are guided in an upward vertical direction and then a downward vertical direction, they are prevented from falling downwards because they confront the guide sections which are separated by an interval narrower than the width of the small pieces, and hence the small pieces are conveyed whilst maintaining a virtually perpendicular position with respect to the stacking magnetic conveyor. Consequently, the small pieces transported by the stacking magnetic conveyor are stacked accurately in an aligned and orderly state on the small-piece receiving plate.

BRIEF DESCRIPTION OF THE DRAWINGS

FIGS. 19A–19H are timing charts of the aforementioned thin sheet punching device;

FIGS. 20A–20F are diagrams showing one example of conventional manufacturing steps for a jacket plate forming a blank piece for making an outer jacket for a battery.

BEST MODE FOR CARRYING OUT THE INVENTION

Figure 1:
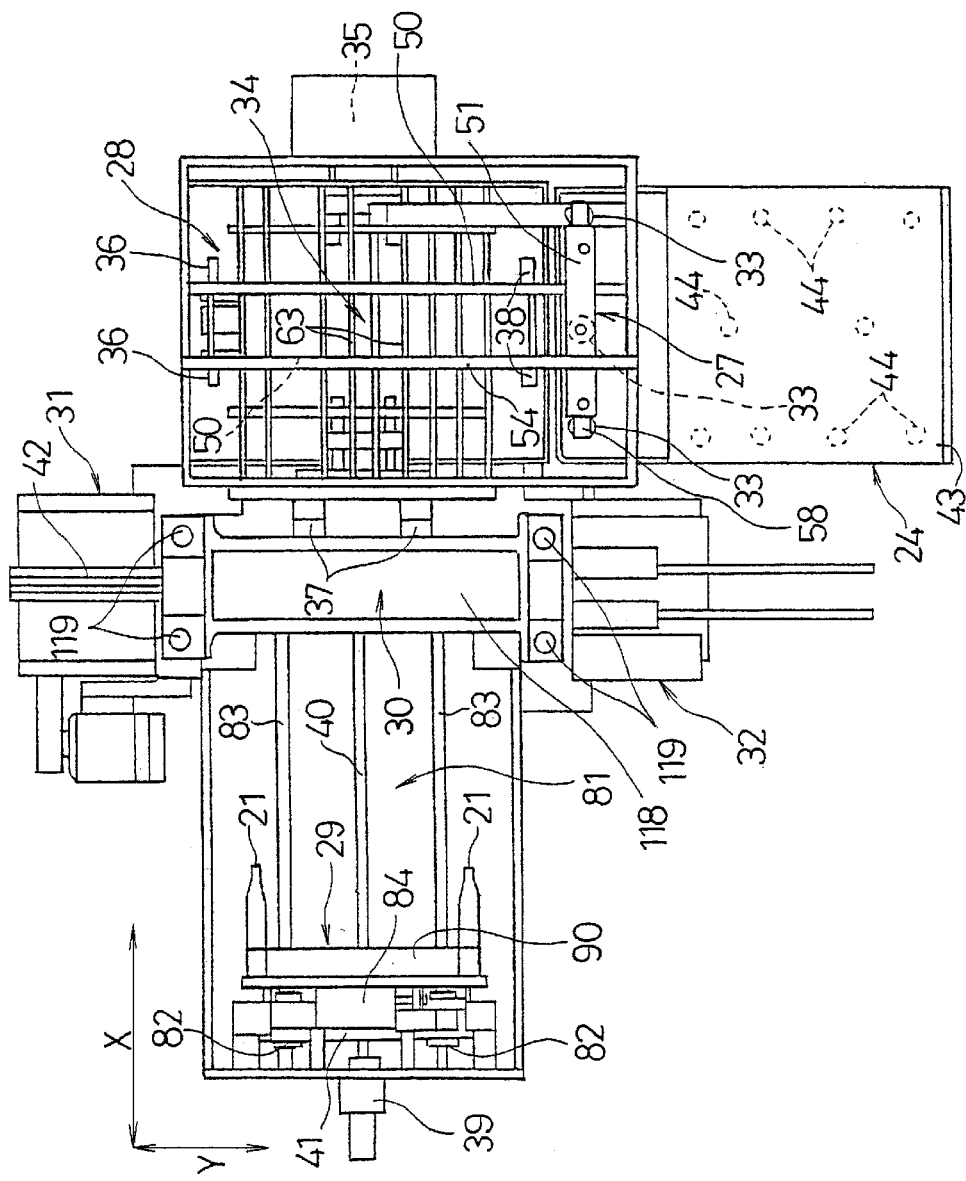
FIG. 1 is an approximate plan view showing a thin sheet punching device according to one embodiment of the present invention.

Below, preferred embodiments of the present invention are described with reference to the accompanying drawings. FIG. 1 is an approximate plan view showing a thin sheet punching device according to one embodiment of the present invention. This embodiment relates to one example of a thin sheet punching device suitable for fabricating a large number of similarly shaped small blanks for the outer jackets of batteries, by punch processing of a large thin sheet of raw material. Before describing the construction of the device, a preliminary explanation of the large thin sheet and the sequence of steps for punch processing this large thin sheet will be given.

Figure 2:
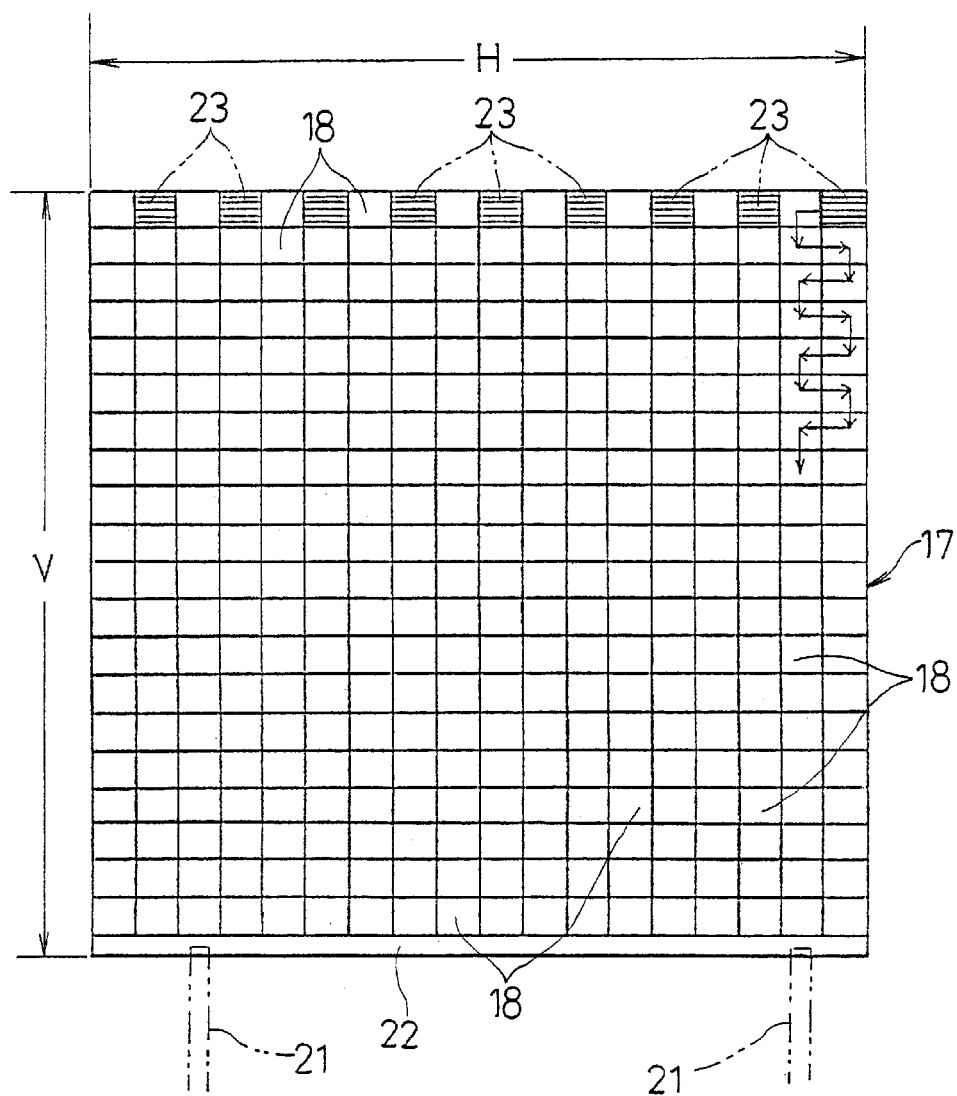
FIG. 2 is a plan view showing a large thin sheet which forms the raw material for the aforementioned thin sheet punching device.

FIG. 2 is a plan view showing a large thin sheet 17 of raw material, which is the object to be punch pressed by the aforementioned thin sheet punching device. This large thin sheet 17 is of relatively large size, having, for instance, a horizontal dimension H of 906.3 mm and a vertical dimension of 895 mm, and it is made from tinplate steel sheet having a thickness of 0.2 mm. Print patterns 18 representing the type of battery, output voltage, positive/negative electrode identification, manufacturer's name, and the like, for when the battery outer jackets are formed, are previously printed onto one face of the aforementioned large thin sheet 17, the number of said print patterns 18 being 18×20 in the horizontal direction and vertical direction, respectively, making a total of 360 patterns. The thin sheet punching device according to this embodiment is able to produce small blanks by punch processing the large thin sheet 17 accurately, along the outer shape of the print patterns 18.

Figure 3:
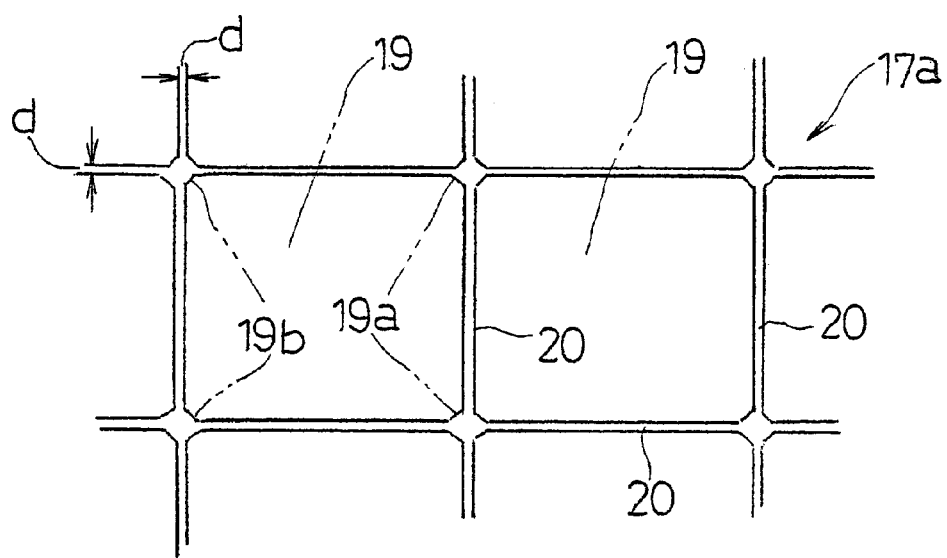
FIG. 3 is an enlarged partial plan view showing material waste after the aforementioned large thin sheet has been punch processed.
Figure 21A:
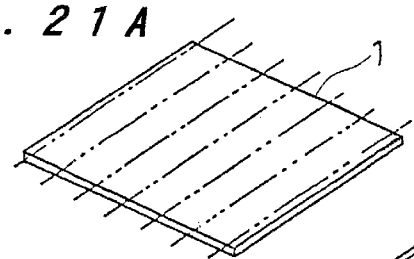
FIGS. 21A–21F are diagrams showing a further example of conventional manufacturing steps for a jacket plate forming a blank piece for making an outer jacket for a battery.
Figure 21B:
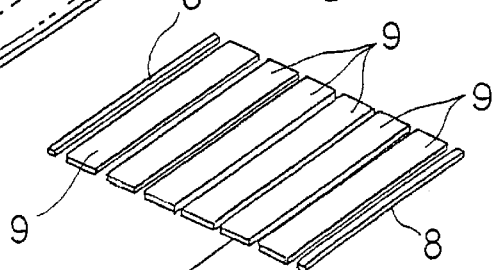
Figure 21C:
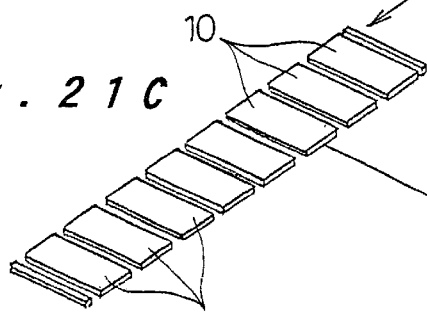
Figure 21D:
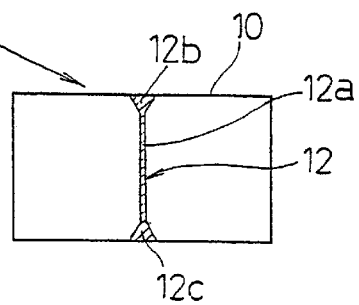
Figure 21E:
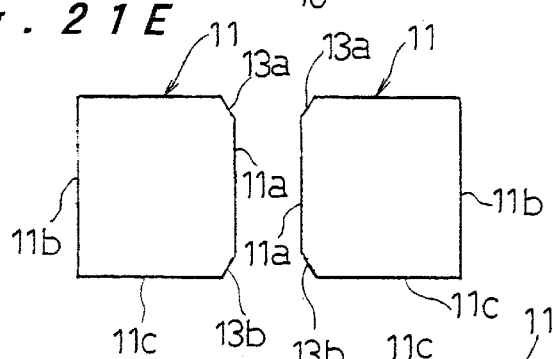
Figure 21F:
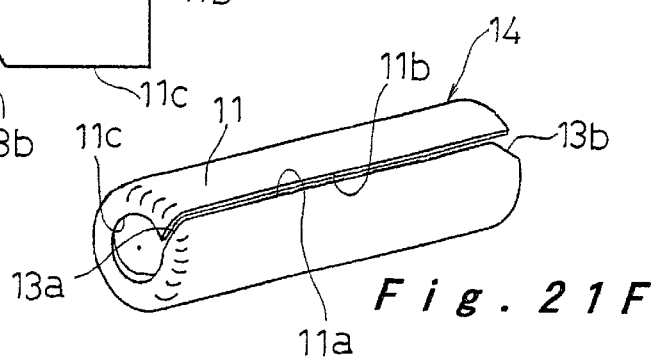

FIG. 3 is a partial enlarged plan view showing material waste 17a after punching processing of the large thin sheet 17. Each of the sections accurately punched out along the outer shape of the print patterns 18 in the large thin sheet 17 form small blanks 19 for battery outer jackets, these punched out small blanks 19 each having a small square shape of dimensions 49.6 mm×42.9 mm, for instance, and each having a similar shape comprising triangular cutaways 19a, 19b at the respective four corners thereof. The material waste 17a after punching is a lattice shape consisting of very thin punch margin 20 having a width of 0.5 mm, for example. According to the conventional method illustrated in FIG. 21D, wherein second intermediate sheets 10 are cut by pressing and then divided into two jacket blanks 11, it is necessary to set a punch margin of a minimum of 0.5 mm on the respective side faces of the two jacket blanks 11, making a total of 1 mm. Therefore, in the thin sheet punching device according to the present embodiment, the material waste 17a is reduced dramatically and the material yield rate is significantly improved. In this embodiment, the punch margin 20 is set to 0.5 mm, but it may be set within a range of 1.0–0.4 mm. This point will be described later in detail.

In FIG. 2, a total of 360 print patterns 18 are printed onto one side of a large thin sheet 17, an interval of 0.5 mm corresponding to the punch margin 20 being left between each pattern, as FIG. 3 illustrates. At one end of the large thin sheet 17 (the lower side of the large thin sheet 17 in the diagram), a clamping margin 22 which can be held by two chuck tools 21 is provided running along the edge. This clamping margin 22 is set to a width of approximately 25 mm, for example. In this embodiment, of the eighteen print patterns 18 in each horizontal row, every other print pattern, in other words, a total of nine print patterns, as indicated by the horizontal shading in the diagram, are punched out simultaneously. Therefore, nine press punches 23 for punching out the print patterns 18 are provided accurately in a single horizontal row in such a manner that their respective punching holes are disposed at intervals corresponding to the alignment pitch of the print patterns 18.

Next, the procedure for punch pressing 360 print patterns 18 is described. The arrows shown in FIG. 2 indicate the sequence for punching out print patterns 18 in two adjacent vertical columns on the right-hand side, by means of the same punching tool 23 disposed on the right-hand end of the configuration. The print patterns 18 in each other pair of adjacent vertical columns are respectively punched out by a single punching tool 23, in a similar sequence. In other words, FIG. 2 shows a state where the large thin sheet 17 is held by a pair of chuck tools 21 and moved to register it in a control start position. In this registered state, the positions of the nine alternate printing patterns 18 in the first row coincide respectively with the positions of the corresponding punching tools 23.

The total of nine alternate printing patterns 18 in the first row are punched out by carrying out punch processing in the aforementioned control start position. Thereupon, the large thin sheet 17 is moved from the position illustrated in the diagram towards the right by a prescribed movement pitch in the horizontal direction, namely, 49.6+0.5=50.1 mm, and the remaining printing patterns 18 in the first row are aligned with the corresponding punching tools 23 and then punched out. From this state, the large thin sheet 17 is moved forwards (upward direction in the diagram) by a vertical movement pitch, namely, 42.9+0.5=43.4 mm, and a total of nine alternate printing patterns 18 in the second row are punched out. Further, from this state, the large thin sheet 17 is moved towards the left by a horizontal movement pitch and the nine remaining printing patterns 18 in the second row are punched out. Thereupon, from this state, the large thin sheet 17 is moved forwards by a vertical movement pitch, and a total of nine alternate printing patterns 18 in the third row are punched out. Thereafter, the punching operation is repeated similarly to the foregoing description.

Consequently, in the thin sheet punching device according to this embodiment, in addition to reducing the number of cutting steps performed by a slitter device and hence greatly simplifying the operating procedure in comparison with a conventional method, since the large thin sheet 17 is held by two chuck tools 21 and is punched by punching tools 23 each time the large thin sheet 17 is moved by a prescribed movement pitch in the horizontal direction and forward direction, it is possible to fabricate small blank pieces 19 with a good productivity rate by a consecutive series of punching operations.

Next, a description is given of a thin sheet punching device capable of producing a large number of small blank pieces 19 by performing accurate punch processing on a large thin sheet 17 as described above. In FIG. 1, a plurality of large thin sheets 17 having 360 printing patterns 18 printed on one side thereof as shown in FIG. 2 are set in a superposed state on a thin sheet setting table 24. A thin sheet transporting mechanism 27 sequentially picks up only the uppermost sheet of the large thin sheets 17 set on the thin sheet setting table 24, and transports same to a material supply/position registering area 34. A thin sheet positioning mechanism 28 is provided in the material supply/position registering area 34, and the large thin sheet 17 transported by the thin sheet transporting mechanism 27 is registered in a prescribed position. A thin sheet movement control mechanism 29 performs movement control in such a fashion that the large thin sheet 17 registered in position by the aforementioned thin sheet positioning mechanism 28 and held by the aforementioned two chuck tools 21 is transported to a control start position, which is the position shown in the diagram, whereupon the respective print patterns 18 on said large thin sheet 17 are positioned opposing the press punching tools 23 in the prescribed sequence illustrated in FIG. 2.

The thin sheet punching device further comprises a punch press machine 30 for punching the large thin sheet 17 by means of the aforementioned punching tools 23, a small blank piece transporting and arranging mechanism 31 for transporting the small blanks 19 obtained by punching out the print patterns 18 on the large thin sheet 17 by means of the aforementioned punch press machine 30, to the exterior of the punch press machine 30, and stacking them in an arranged state, and a metal mold exchanging mechanism 32 for exchanging the press punching tools 23 in the punch press machine 30. In the diagram, of the elements of the small blank piece transporting and arranging mechanism 31, only the output magnetic conveyor 42 forming a portion thereof is illustrated, and the remaining composition thereof is described hereinafter.

Before giving a detailed description of each portion of the aforementioned thin sheet punching device, a general explanation of the operation of same is provided. When a pallet (not illustrated) on which a plurality of large thin sheets 17 are stacked is disposed on the thin sheet setting table 24 by means of a fork lift and then set in a prescribed position, three suction cups 33 of the thin sheet transporting mechanism 27 descend and vacuum suction the front end (upper end in the diagram) of the uppermost large thin sheet 17 on the thin sheet setting table 24. Thereupon, the thin sheet transporting mechanism 27 moves towards the material supply/position registering area 34, and the large thin sheet 17 is dragged to the material supply/position registering area 34. The large thin sheet 17 transported to the material supply/position registering area 34 is deposited onto the material supply/position registering area 34 by means of the respective suction cups 33 releasing their vacuum suction.

Thereupon, in the thin sheet positioning mechanism 28, first and second reference position stopper members 37, 38, for restricting the respective positions of one edge of the large thin sheet 17 on the side of the punch press machine 30 and another edge adjacent to same, are respectively raised from retracted positions and set in registration reference positions. Thereupon, first and second pushers 35, 36 provided respectively opposing the reference position stopper members 37, 38 are respectively moved in a forward direction, thereby pushing and moving the large thin sheet 17 and pressing the two adjacent edges of the large thin sheet 17 against the reference position stopper members 37, 38. Thereby, the large thin sheet 17 inside the material supply/position registering area 34 is registered accurately in a prescribed position.

Next, in the thin sheet movement control mechanism 29, an X direction movement control servo motor 39 is driven in the forward direction, and the carriage base 41, which engages with a ball screw 40 that is rotated by means of the servo motor 39, is caused to move linearly from the control start position in the diagram towards the material supply/position registering area 34, where it halts when the pair of chuck tools 21 have arrived in the gripping position indicated by the double-dotted lines in FIG. 2. Thereupon, when the pair of chuck tools 21 have held the clamping margin of the large thin sheet 17, the servo motor 39 is driven in reverse. Thereby, the carriage base 41 is caused to move linearly towards the control start position shown in the diagram whilst transporting the large thin sheet 17 held by the chuck tools 21. The X direction movement control servo motor 39 is subjected to feedback control on the basis of program control implemented by a controller (not illustrated), and it halts the carriage base 41 in the control start position, in a registered state where nine print patterns 18 in the first row of the large thin sheet 17 are respectively opposing punching tools 23, in an accurate manner.

Thereupon, in the thin sheet movement control mechanism 29, the X direction movement control servo motor 39, and a Y direction movement control servo motor (not illustrated) for controlling the movement of a carriage 84 mounted on the carriage base 41 and movable in a Y direction perpendicular to the X direction, are each caused to rotate by a prescribed pitch in alternating fashion. Thereby, the pair of chuck tools 21 provided on the carriage 84 via a holding arm member 90 are alternately subjected to Y direction movement control for moving them by a prescribed movement pitch in either direction of the Y axis, and X direction movement control for advancing them by a prescribed pitch in the X direction, towards the material supply/position registering area 34, hence causing the large thin sheet 17 held by the chuck tools 21 to move alternately in the X direction and Y direction.

Each time the large thin sheet 17 is registered in position by being moved through a prescribed movement pitch in the X direction or either direction in the Y axis, by means of the thin sheet movement control mechanism 29, nine print patterns 18 are punched out simultaneously by driving the punch press machine 30. The small blank pieces 19 removed by punching out the print patterns 18 are transported to the exterior of the punch press machine 30 by means of the output magnetic conveyor 42 of the small blank piece transporting and arranging mechanism 31.

Next, the detailed construction and action of the various sections of the aforementioned thin sheet punching device are described successively, with reference to FIG. 4 to FIG. 19. In FIGS. 4 to 19, in order to aid understanding, the essential elements only are illustrated in simplified form for explaining the operational principles of the device. Other members, such as safety members or operation facilitating members which are vital for practical application of the device, have been omitted from the diagrams.

Figure 4:
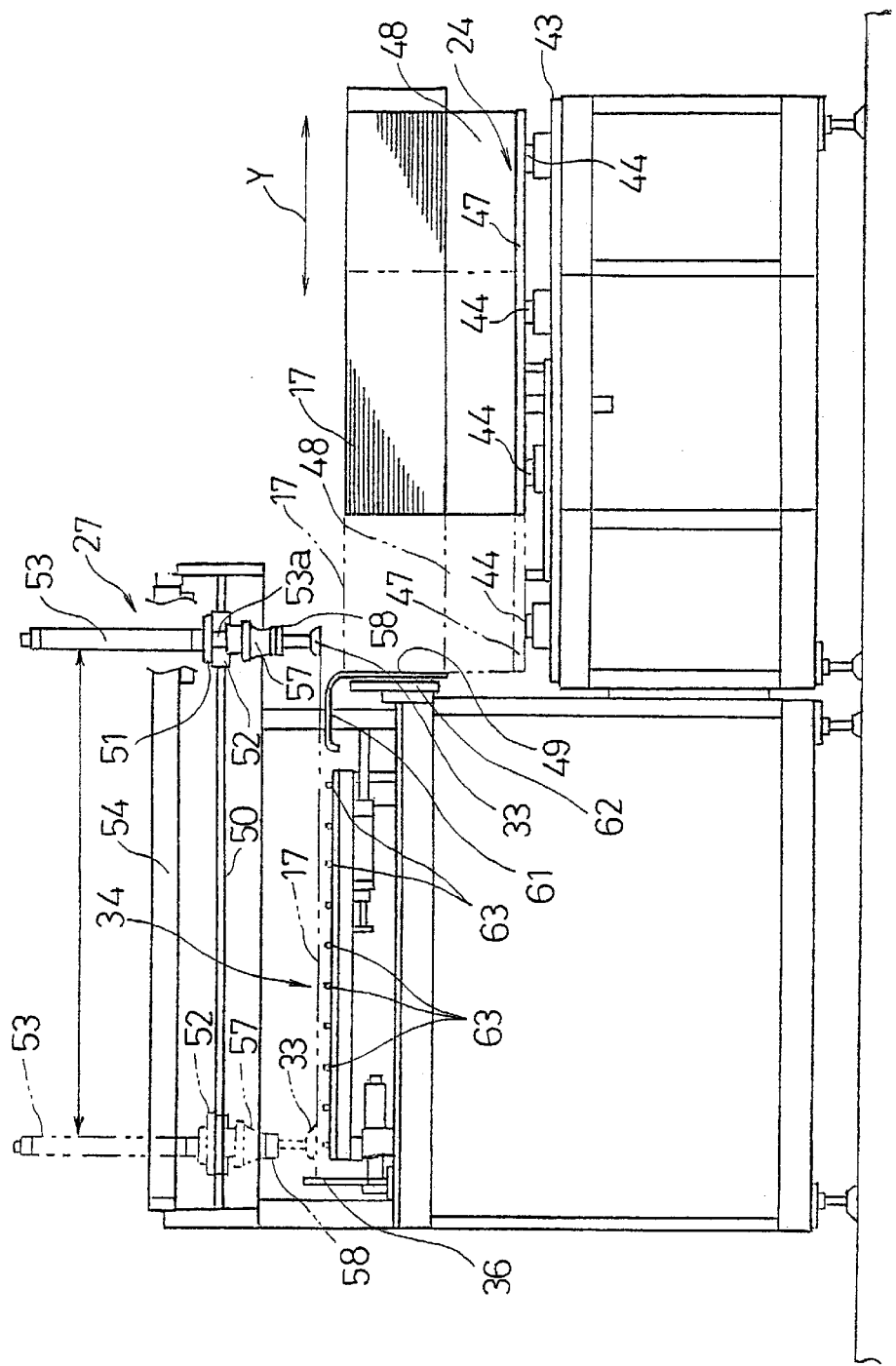
FIG. 4 is a partially cutaway left-hand side view showing a thin sheet setting table and a thin sheet transporting mechanism in the aforementioned thin sheet punching device.

FIG. 4 is left-hand side view of FIG. 1 incorporating a partial section showing the thin sheet setting table 24 and the thin sheet transporting mechanism 27. In the thin sheet setting table 24, a plurality of free-moving balls 44 made from steel spheres and held rotatably on top of a table receiving section 43 are provided, and furthermore a thin sheet receiving plate 47 made from steel plate is provided movably on top of each free-moving ball 44. The thin sheet receiving plate 47 is restricted by a guide member (not illustrated) in such a manner that it moves linearly in the Y direction only, reciprocally with respect to the thin sheet transporting mechanism 27.

Large thin sheets 17 bearing a plurality of print patterns 18 printed on one side thereof as illustrated in FIG. 2 are transported from the print supplier or from a printing stage in a state where 1000–2000 sheet units are stacked on each other on a pallet 48, and they are positioned on the thin sheet receiving plate 47 drawn out to a forward position (right-hand position in the diagram) as indicated by the solid lines in FIG. 4, by means of a fork lift, or the like. The large thin sheets 17 positioned on the thin sheet receiving plate 47 are then pushed lightly towards the thin sheet transporting mechanism 27 by an operator, whereby the thin sheet receiving plate 47 moves extremely smoothly due to the respectively rotatable free-moving balls 44, and the large thin sheets 17 are registered in a prescribed position pressed against a positioning plate 49, as indicated by the double-dotted lines in FIG. 4.

Even though the total weight is large, for instance, in the order of one tonne, since the thin sheet receiving plate 47 moves extremely smoothly due to the rotation of the plurality of free-moving balls 44, the aforementioned large thin sheets 17 can be moved and registered in a prescribed position by means of a small pushing force. Moreover, since the large thin sheets 17 are registered accurately in position by the thin sheet positioning mechanism 28, when they are moved into the material supply/position registering area 34 in the aforementioned manner, their positional registration in the Y direction can be achieved simply by pressing them against the positioning plate 49 at this time. A fixing lever (not illustrated) is operated when the sheets have been registered in the Y direction in this way, whereby the thin sheet receiving plate 47 is fixed in a state where it is separated from the free-moving balls 44, and the setting operation for the large thin sheets 17 is completed.

As described above, in this thin sheet punching device, the setting of a large number of large thin sheets 17 stacked on top of each other can be carried out very simply and swiftly. By contrast, general means for setting works, such as thin sheets, in a conventional device of this kind, involve an extremely complicated and bulky mechanism, wherein a plurality of receiving stands are provided at prescribed intervals in a holding shelf, a pallet holding a plurality of works is positioned on each of the receiving stands, and an elevator is moved vertically to register the position thereof at the height position of a desired receiving stand, whereupon the pallet on the receiving stand is pulled out onto the elevator, the elevator is lowered and halted at the same height position as the upper face of a lifter, and the pallet on the elevator is then pushed out onto the lifter.

Figure 5:
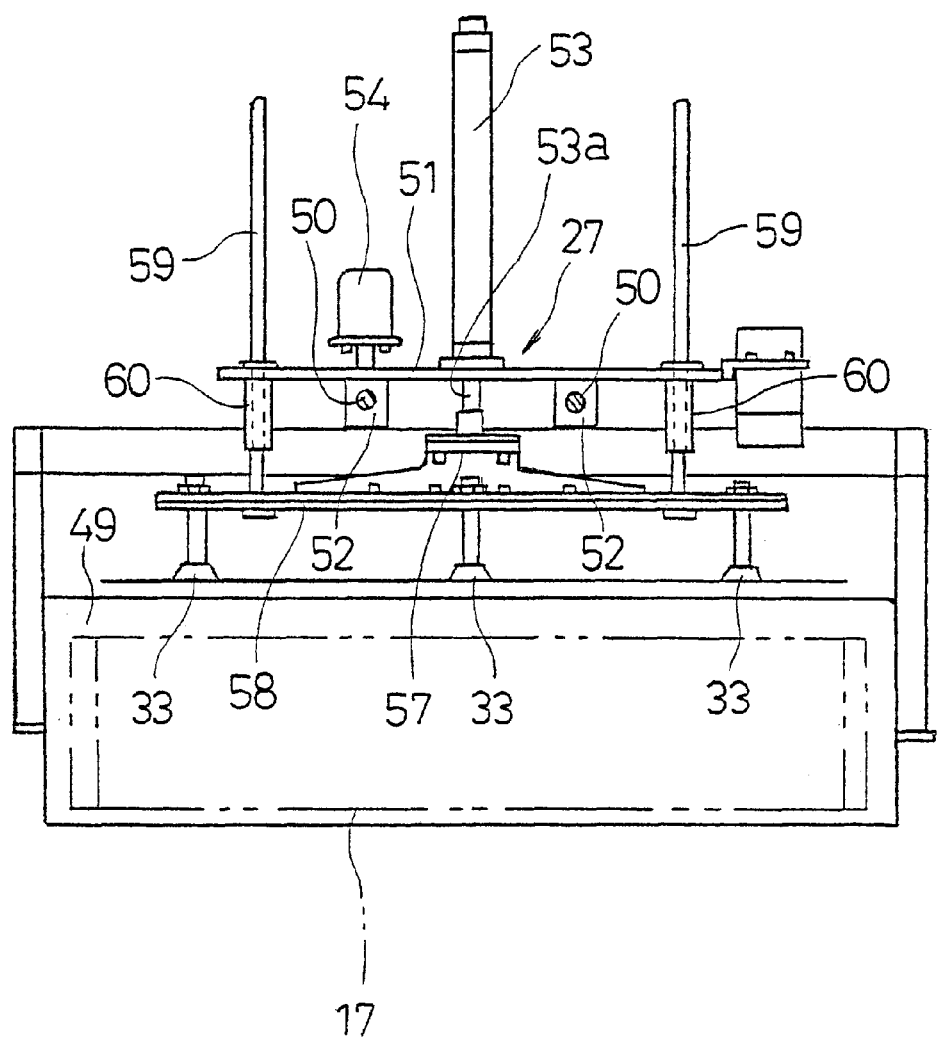
FIG. 5 is a front view showing the aforementioned thin sheet transporting mechanism.

FIG. 5 is a front view showing the thin sheet transporting mechanism 27. The thin sheet transporting mechanism 27 comprises as supporting members two guide shafts 50 running in mutually parallel alignment in the transport direction of the large thin sheet 17, in other words, the Y direction. Sliders 52 fixed respectively to the lower face of a supporting plate are installed slidably on these guide shafts 50, thereby supporting the supporting plate 51 movably in the Y direction along the respective guide shafts 50.

A lifting/lowering air cylinder 53 for the suction cups 33 is provided in the central region of the aforementioned supporting plate 51 and a transport air cylinder 54 is installed on the supporting plate 51 to one side of the central region thereof. A band-shaped installing member 58 is installed in a suspended state on a rod 53a of a lifting/lowering air cylinder 53, by means of a coupling member 57, and three suction cups 33 are fixed in a hanging state to the installing member 58. Moreover, a pair of guide bars 59 provided in the vicinity of each end of the installing member 58 are held slidably through holding members 60 provided vertically on the supporting plate 51. The upper portion of the positioning plate 49 for the large thin sheets 17, on the other hand, bends and extends in a horizontal direction, as shown in FIG. 4, and forms a guide section 61 for the large thin sheets 17. A magnet plate 62 having a strong magnetic force is provided on the rear side of the positioning plate 49.

Next, the operation of transporting the large thin sheets 17 by means of the aforementioned thin sheet transporting mechanism 27 is described. The position registration plate 49 is magnetized by the strong magnetic force of the magnet plate 62, and the front end portions of a number of the uppermost sheets of the plurality of large thin sheets 17 stacked on top of the pallet 48, these front end portions being in contact with the respective position registration plates 49, receive a magnetic action and, for example, one side thereof is magnetized as an S pole, whilst the other side thereof is magnetized as an N pole. Thereby, the front end portions of the number of uppermost large thin sheets 17 are always held in a separated state wherein they are mutually separated by small intervals.

When the thin sheet transporting mechanism 27 has reached the front end position indicated by the solid lines in FIG. 4, the lifting and lowering air cylinder 53 is driven in a direction expelling the rod 53a and the three suction cups 33 descend, and respectively vacuum suction onto the front end portion of the uppermost large thin sheet 17. Thereupon, the lifting and lowering air cylinder 53 is driven in a direction which retracts the rod 53a and hence the suction cups 33 pick up the front end portion of the uppermost large thin sheet 17 vacuum suctioned thereto. In this case, since the front end portion of the uppermost large thin sheet 17 is separated from the large thin sheets 17 beneath by means of a magnetic force as described above, the suction cups 33 are able to raise the single uppermost large thin sheet 17 vacuum suctioned thereto, in a smooth manner. Moreover, although not illustrated in the diagram, the position registration plate 49 is also provided with an air expulsion nozzle for expelling compressed air towards the stacked large thin sheets 17. Thereby, the uppermost large thin sheet 17, the front end portion of which is picked by vacuum suctioning to the three suction cups 33, can be separated more reliably from the large thin sheets 17 beneath and guided upwards smoothly, by means of the rear portion thereof being raised upwards by the expulsion of compressed air.

Next, the thin sheet transporting mechanism 27 is retracted towards the material supply/position registering area 34, by driving the transport air cylinder 54. By means of this movement, the large thin sheet 17 whose front end portion is vacuum suctioned to the three suction cups 33 is guided smoothly upwards, whilst the lower portion thereof slides over the guide member 61, and hence it is transported by dragging to the material supply/position registering area 34 by the thin sheet transporting mechanism 27. In the thin sheet transporting mechanism 27, when the large thin sheet 17 has been moved to a prescribed position as indicated by the double-dotted lines in FIG. 4, the transport air cylinder 54 is halted by means of the controller (not illustrated), whereupon the suction hold on the large thin sheet 17 by the suction cups 33 is released. Thereby, the large thin sheet 17 is positioned on top of the plurality of receiving stands 63 in the material supply/position registering area 34.

Figure 6:
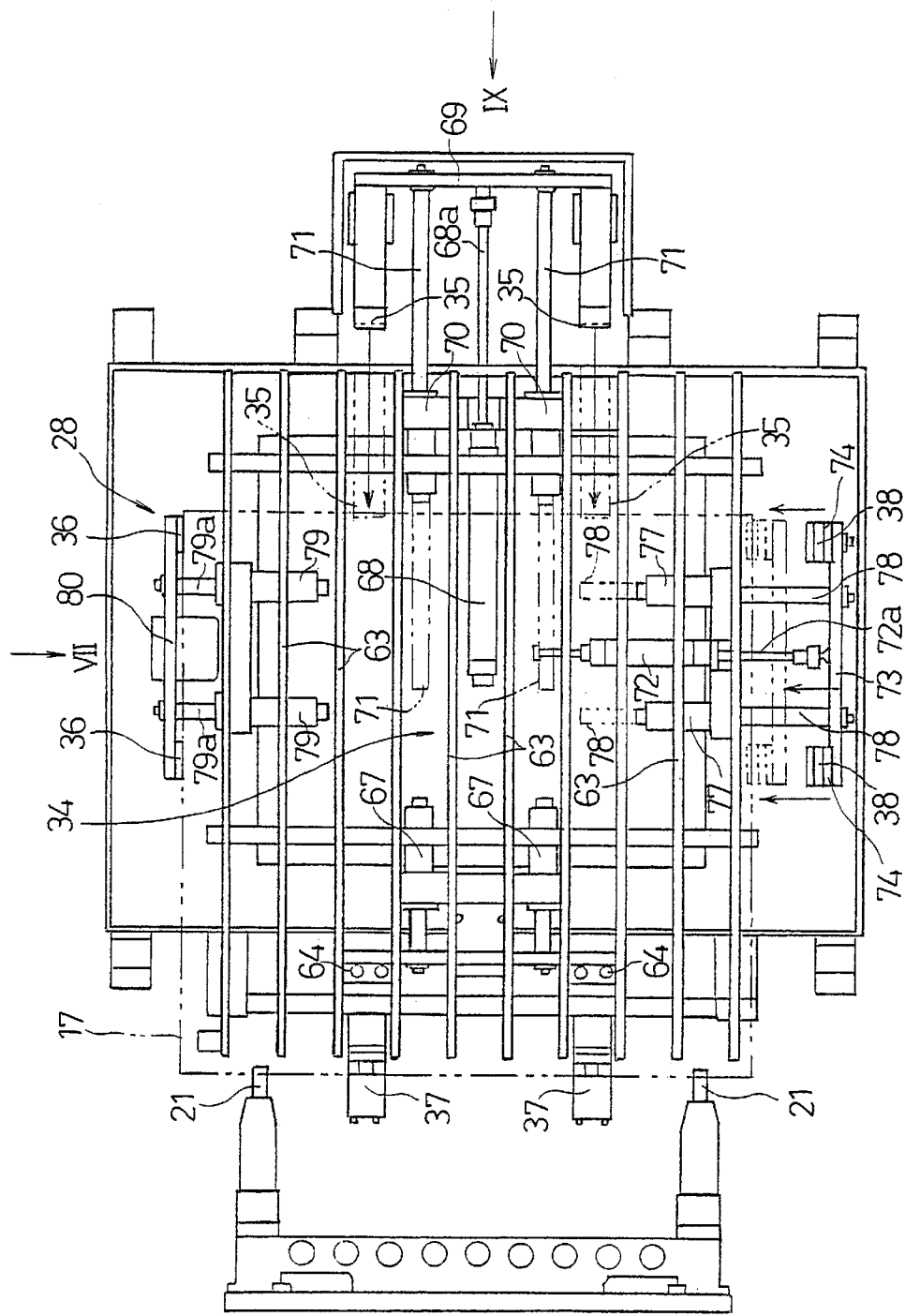
FIG. 6 is a plan view showing a thin sheet positioning mechanism disposed in a material supply/position registering area in the aforementioned thin sheet punching device.

FIG. 6 is a plan view showing the thin sheet positioning mechanism 28 located in the material supply/position registering area 34. The thin sheet positioning mechanism 28 comprises a first and a second reference position stopper member 37, 38 for respectively restricting the positions of two adjacent edges of the large thin sheet 17, and a first and a second pusher 35, 36 which act so as to push the large thin sheet 17 respectively against the aforementioned reference position stopper members 37, 38.

Figure 7:
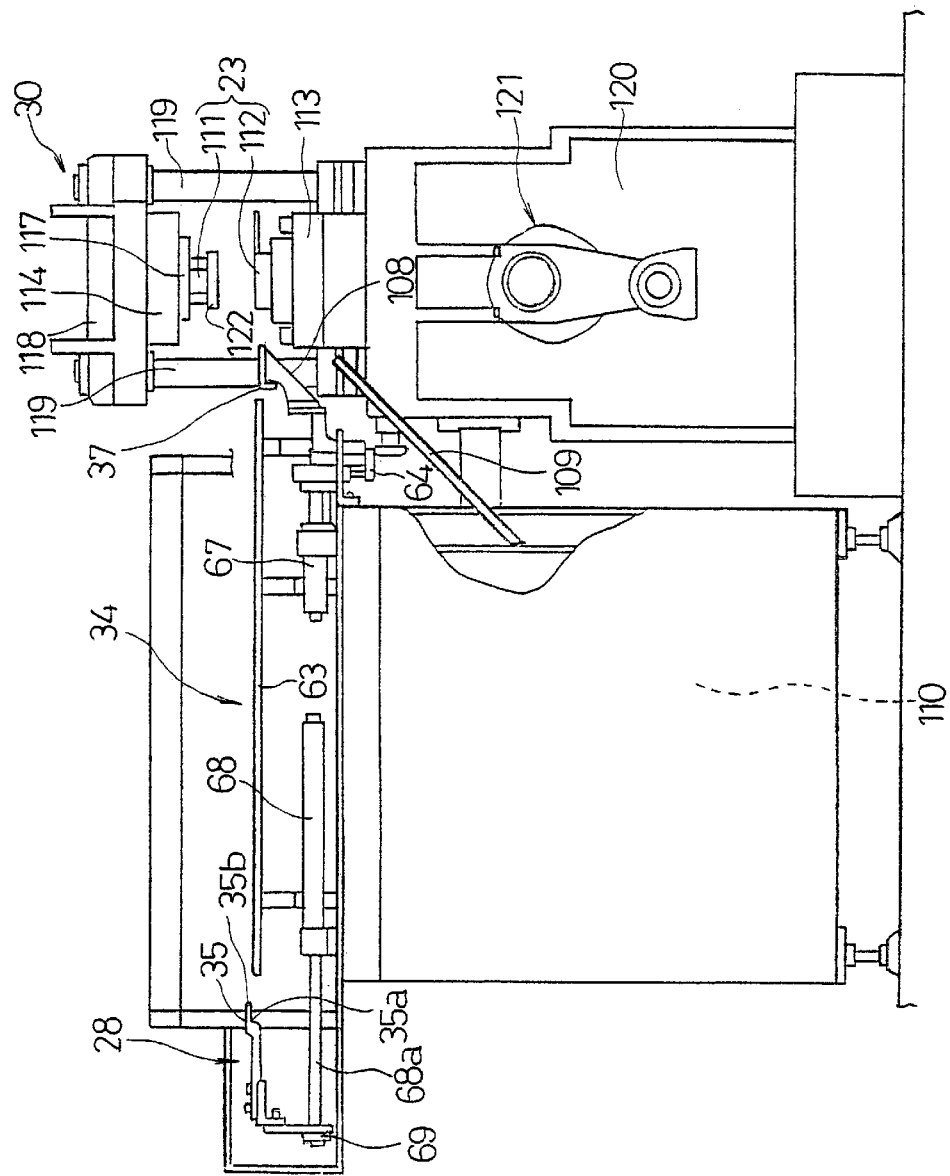
FIG. 7 is a rear view of the thin sheet positioning mechanism in a pre-operational state, illustrating the thin sheet positioning mechanism and the punch press machine in the aforementioned thin sheet punching device.
Figure 8:
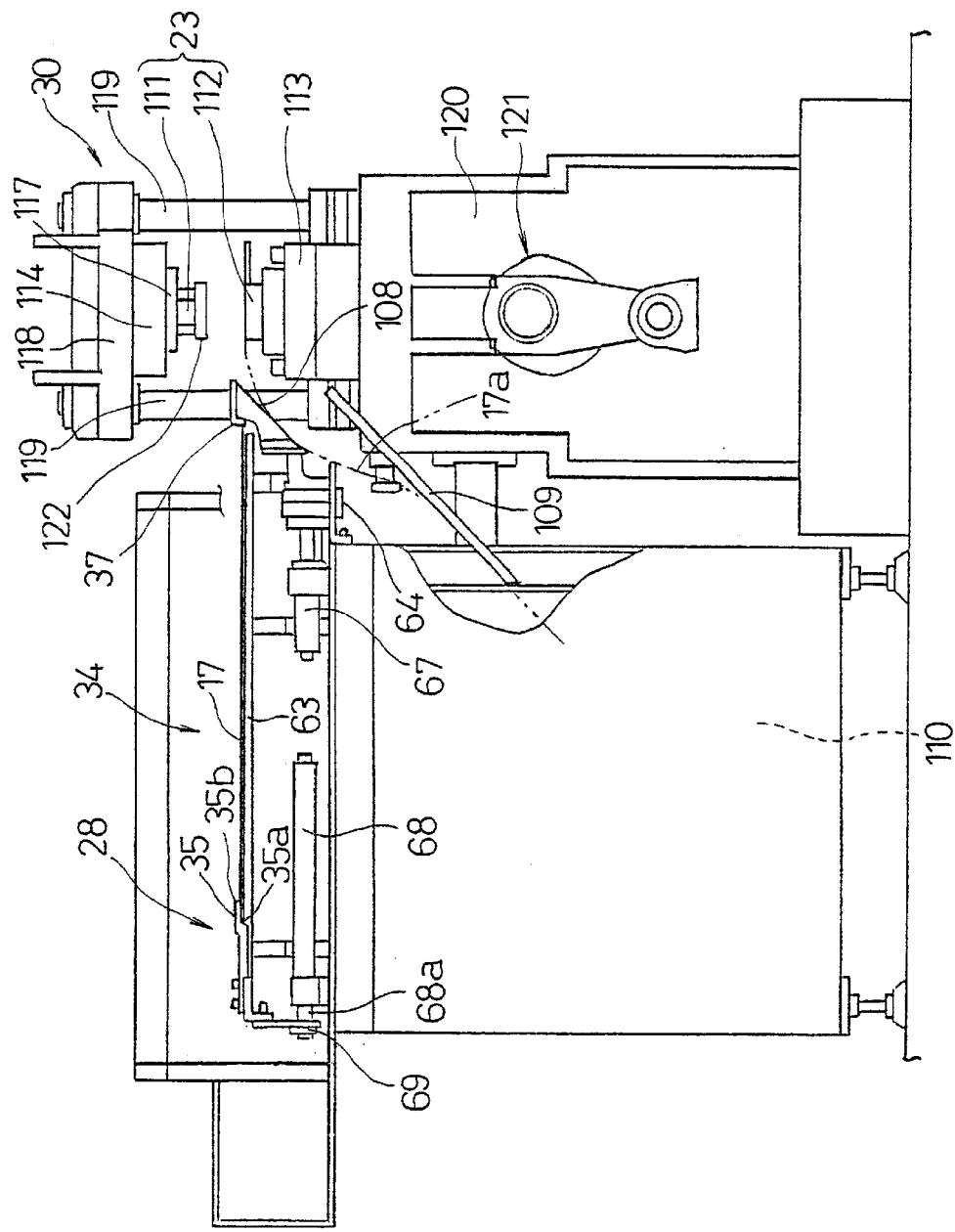
FIG. 8 is a rear view of the thin sheet positioning mechanism in a post-operational state, illustrating the aforementioned thin sheet positioning mechanism and punch press machine.

FIG. 7 and FIG. 8 are respective rear face views showing the thin sheet positioning mechanism 28 and the punch press machine 30 as observed from the direction of arrow VII in FIG. 6. FIG. 7 shows the thin sheet positioning mechanism 28 in a standby state, whilst FIG. 8 shows a state after operation of the thin sheet positioning mechanism 28. As FIG. 6 clearly demonstrates, a pair of the first reference position stopper members 37 are provided, in such a manner that they can move upwards and downwards in the same position in the horizontal direction, by means of a vertical movement actuator 64 operated by an air cylinder 67. When the large thin sheet 17 is being transported towards the material supply/position registering area 34 by means of the thin sheet transporting mechanism 27, the first reference position stopper members 37 are lowered to a retracted position as shown in FIG. 7, and once the large thin sheet 17 has been located in the material supply/position registering area 34, they are raised to the registration reference position illustrated in FIG. 8.

There are also provided a pair of the first pushers 35 for pushing the large thin sheet 17 against the aforementioned first reference position stopper members 37, as shown in FIG. 6 and FIG. 7, and these respectively have a shape comprising a pressing face 35*a* for pushing the large thin sheet 17 against the first reference position stopper members 37, and an auxiliary pressing element 35*b* projecting in a forward direction above the pressing face 35*a*, for making contact with the upper face of the large thin sheet 17. Therefore, the first pushers 35 are provided in a horizontally movable state, in a configuration whereby the lower face of each auxiliary pressing element 35*b* is positioned above the receiving stand 63 by an amount corresponding to the thickness of the large thin sheet 17.

As shown in FIG. 6, the aforementioned pair of first pushers 35 are respectively installed on the ends of a coupling arm 69, the central portion of which is fixed to the front end of a rod 68*a* on an air cylinder 68 providing a drive source for same. As can be seen from the comparison between the retracted position shown in FIG. 7 and the solid lines in FIG. 6, and the advanced position shown in FIG. 8 and the double-dotted lines in FIG. 6, the first pushers 35 move through a relatively large range. In other words, when the large thin sheet 17 is being transported inside the material supply/position registering area 34, the first pushers 35 are retracted from the advanced positions to the retracted positions, which are relatively distant therefrom. Consequently, the large thin sheet 17 can be set in a general position on the thin sheet setting table 24, without registering it in position accurately. Moreover, since the pair of first pushers 35 move through a relatively long distance, the coupling arm 69 to which the two pushers 35 are fixed is devised in such a manner that it can move stably whilst being held by a pair of guide bars 71 which pass slidably through a holding section 70.

Figure 9A:
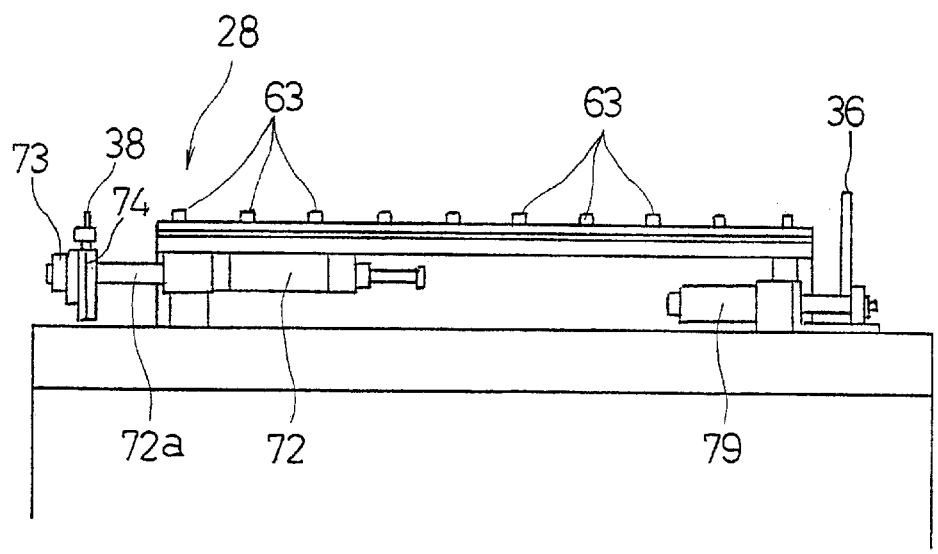
FIG. 9A is a right-hand side view showing a pre-operational state of second reference positions stopper members and second pushers in the aforementioned thin sheet punching device.
Figure 9B:
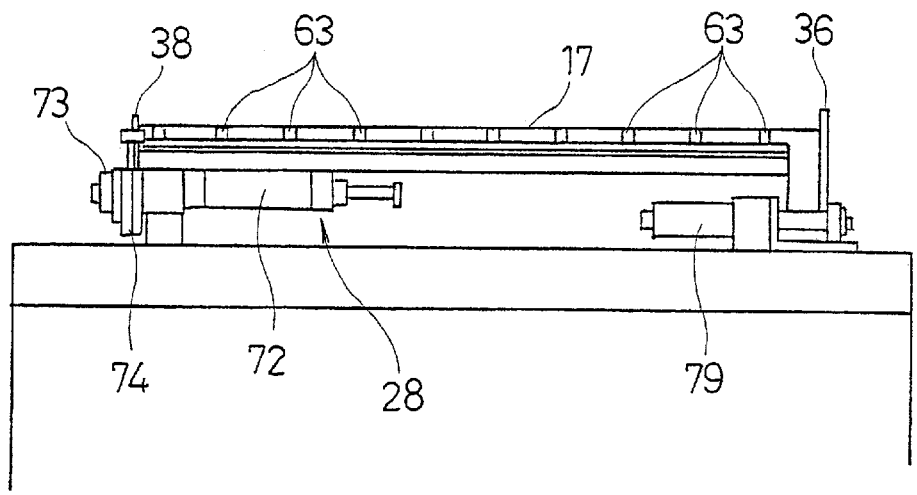
FIG. 9B is a right-hand side view showing the post-operational state of same.

FIG. 9A and FIG. 9B show right-hand side views of the second reference position stopper members 38 and the second pushers 36, as observed from the direction of arrow IX in FIG. 6: FIG. 9A shows a standby state in a retracted position and FIG. 9B shows a post-operational state, respectively. As revealed in FIG. 6, the central region of a coupling arm 73 is fixed perpendicularly to the front end of a rod 72*a* on an air cylinder 72, providing a drive source to the second reference position stopper members 38, and the pair of second reference position stopper members 38 is installed on a vertical movement actuator 74 fixed to both ends of the coupling arm 73. Therefore, when the large thin sheet 17 is being transported to the material supply/position registering area 34 by the thin sheet transporting mechanism 27, the pair of second reference position stopper members 38 are withdrawn to low retracted positions, which are to the rear of the receiving stands 63, as illustrated in FIG. 9A, and when the large thin sheet 17 has been deposited onto the material supply/position registering area 34, they are raised and advanced to registration reference positions, which are higher than the receiving stands 63, as illustrated in FIG. 9B.

The reason that the pair of second reference position stopper members 38 are withdrawn to retracted positions lower than the receiving stands 63 is in order to prevent them from contacting the large thin sheet 17 whilst it is being transported by the thin sheet transporting mechanism 27. Moreover, the pair of second reference position stopper members 38 are withdrawn by a relatively large distance in order that the large thin sheet 17 can be set in a general position without accurate positional registration on the thin sheet setting table 24. In this way, since the pair of second reference position stopper members 38 move through a relatively long distance, the coupling arm 73 is devised in such a manner that it is able to move stably whilst being held by a pair of guide bars 78 which pass slidably through a holding section 77.

As shown in FIG. 6, the pair of second pushers 36 are installed on either end of a coupling member 80 fixed in such a manner that it bridges between the front end portions of the respective rods 79a of a pair of air cylinders 79 which provide a driving force to same. In this embodiment, the thin sheet transporting mechanism 27 is controlled such that it halts when a sensor detects that the large thin sheet 17 under transport has contacted the second pushers 36, and therefore the second pushers 36 move forwards through only a small distance.

Next, the action of the aforementioned thin sheet positioning mechanism 28 is described. This thin sheet positioning mechanism 28 functions once a large thin sheet 17 has been transported by the thin sheet transporting mechanism 27 and deposited on the respective receiving stands 63 in the material supply/position registering area 34, and after the thin sheet transporting mechanism 27 has moved towards the thin sheet setting table 24 and fully passed by the second reference position stopper members 38. More specifically, by means of the thin sheet positioning mechanism 28, at the same time that the pair of first reference position stopper members 37 are raised from their lower retracted positions shown in FIG. 7 to their restricting positions illustrated in FIG. 8, the pair of second reference position stopper members 38 are raised and advanced from their retracted positions shown in FIG. 9A to their restricting positions higher than the receiving stands 63, as shown in FIG. 9B. Thereupon, when the pair of first pushers 35 move from their retracted positions in FIG. 7 to their advanced positions in FIG. 8, from the moment that the pressing face 35a confronts one edge of the large thin sheet 17, the large thin sheet 17 is pressed and moved uniformly whilst sliding over the receiving stands 63, and the opposing edge of the large thin sheet 17 is made to abut on the first reference position stopper members 37. Simultaneously with this operation, the pair of second pushers 36 are moved to advanced positions and the large thin sheet 17 is made to abut on the second reference position stopper members 38.

By means of the aforementioned operations performed by the thin sheet positioning mechanism 28, the two adjacent edges of the large thin sheet 17 inside the material supply/position registering area 34 positioned towards the punch press machine 30 are pressed against the first and second reference position stopper members 37, 38, and thereby accurately registered in a prescribed position. Moreover, by means of the contact between the four edges of the large thin sheet 17 and the reference position stopper members 37, 38 and the pushers 35, 36, the large thin sheet 17 is fixed immovably in the horizontal direction. Furthermore, by being held between the receiving stands 63 and the respective auxiliary pressing elements 35b of the pair of first pushers 35, the large thin sheet 17 is held temporarily in a state where it is registered at a height position where it can be gripped accurately by the chuck tools 21. In FIG. 6, the large thin sheet 17 indicated by the double-dotted lines is registered at the prescribed position, as described above. Consequently, since the large thin sheet 17 can be held accurately in a registered state, rather than unpredictably, when it is to be gripped by the chuck tools 21, it is possible to achieve an accurate positional relationship between the large thin sheet 17 and the chuck tools 21.

Figure 10:
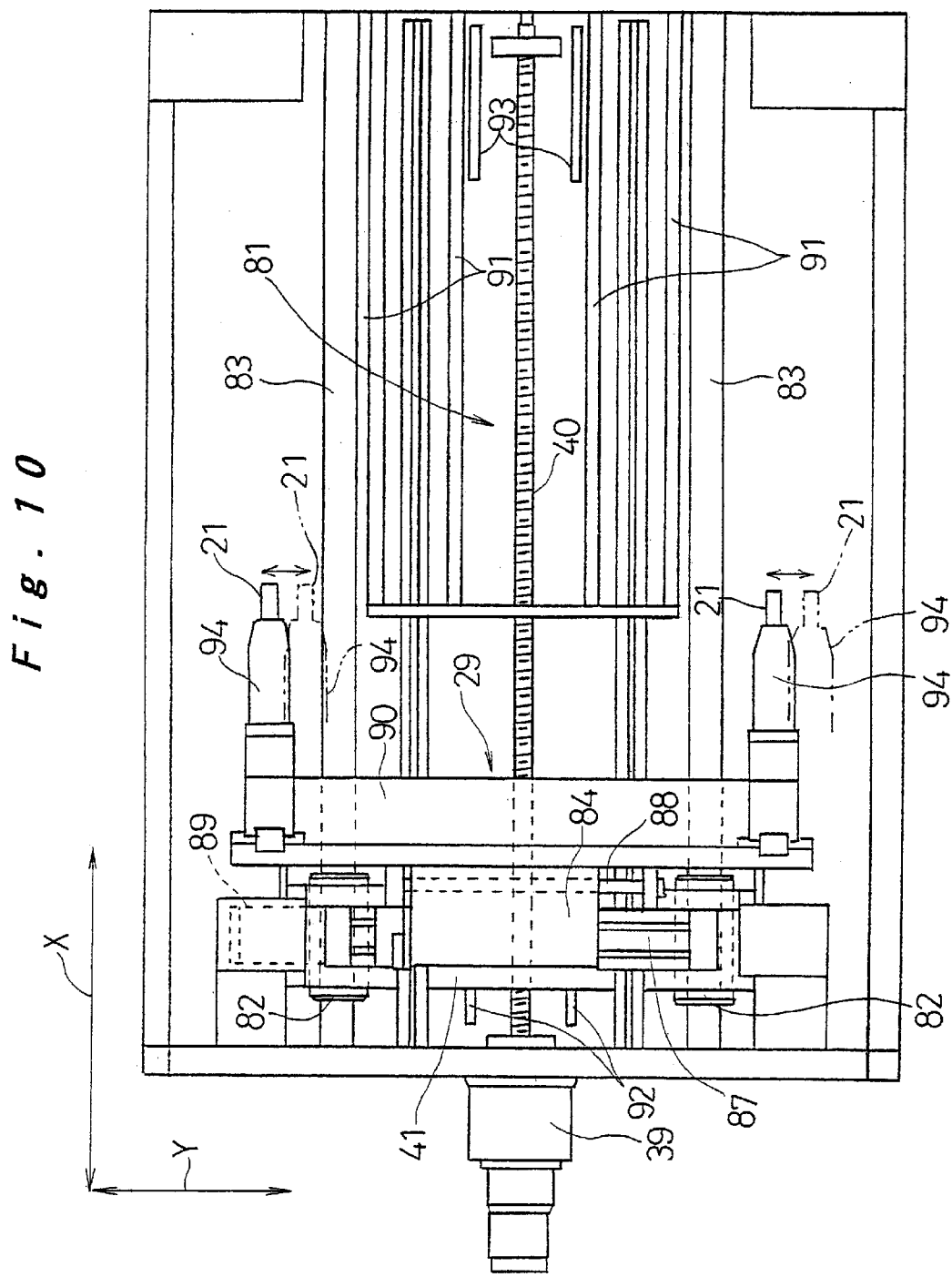
FIG. 10 is a plan view showing a thin sheet movement control mechanism provided in a thin sheet movement control area of the aforementioned thin sheet punching device.
Figure 11:
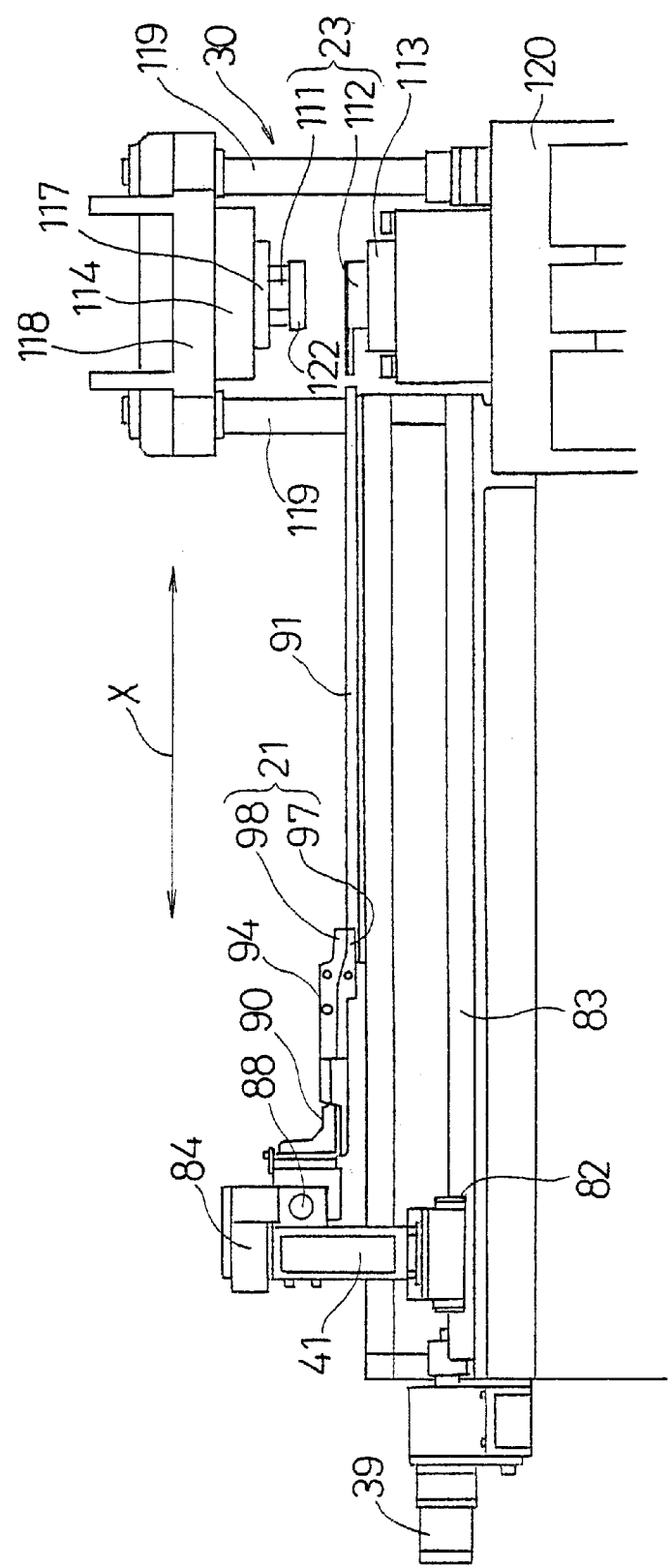
FIG. 11 is a front view showing the aforementioned thin sheet movement control mechanism and punching press machine.

FIG. 10 is a plan view showing a thin sheet movement control mechanism 29 disposed in a thin sheet movement control area, and FIG. 11 is a front view showing the thin sheet movement control mechanism 29 and the punch press machine 30. The thin sheet movement control mechanism 29 is provided with a carriage base 41 which engages with a ball screw 40 rotated by the X direction movement control servo motor 39 and whose movement in the X direction is controlled by the ball screw 40 in accordance with the rotation of the X direction movement control servo motor 39. This carriage base 41 is supported movably in a stable reciprocal fashion in the X direction, by means of a pair of guide members 82 provided respectively on either end of the carriage base 41, these guide members 82 sliding in linear guides 83 positioned mutually in parallel to either side of the ball screw 40.

A carriage 84 is mounted on the aforementioned carriage base 41, movably in the Y direction along the linear guides 87 and a guide shaft 88. This carriage 84 engages with a ball screw (not illustrated) rotated by a Y direction movement control servo motor 89 mounted on the carriage base 41, and hence it is able to move reciprocally in the Y direction on the carriage base 41 by means of the ball screw in accordance with the rotation of the Y direction movement control servo motor 89, whilst being held slidably by a linear guide 87 and the linear shaft 88. An installing arm member 90 having a band shape in plan view and provided with a pair of chuck tools 21 installed a prescribed interval apart is fixed to the carriage 84. Therefore, the pair of chuck tools 21 is able to move reciprocally in the Y direction, integrally with the carriage 84, whilst also moving in the X direction, integrally with the carriage base 41.

Within the range wherein the large thin sheet 17 is moved and controlled and gripped by the chuck tools 21 in the thin sheet movement control area 81, a plurality of supporting rods 91 (in the present embodiment, four supporting rods 91) ground to have high-precision flat surfaces, are installed in mutually parallel positions in the X direction. Thereby, since the large thin sheet 17 is partially supported by each of these supporting rods 91, it can be caused to slide over the supporting rods 91 with little frictional resistance, and hence its movement can be controlled smoothly in the X direction and Y direction. Furthermore, at either end position of the ball screw 40, a start end limit member 92 and a finish end limit member 93 are respectively provided in order to restrict the range of movement of the carriage base 41 by means of the thin sheet movement control mechanism 29.

Figure 12:
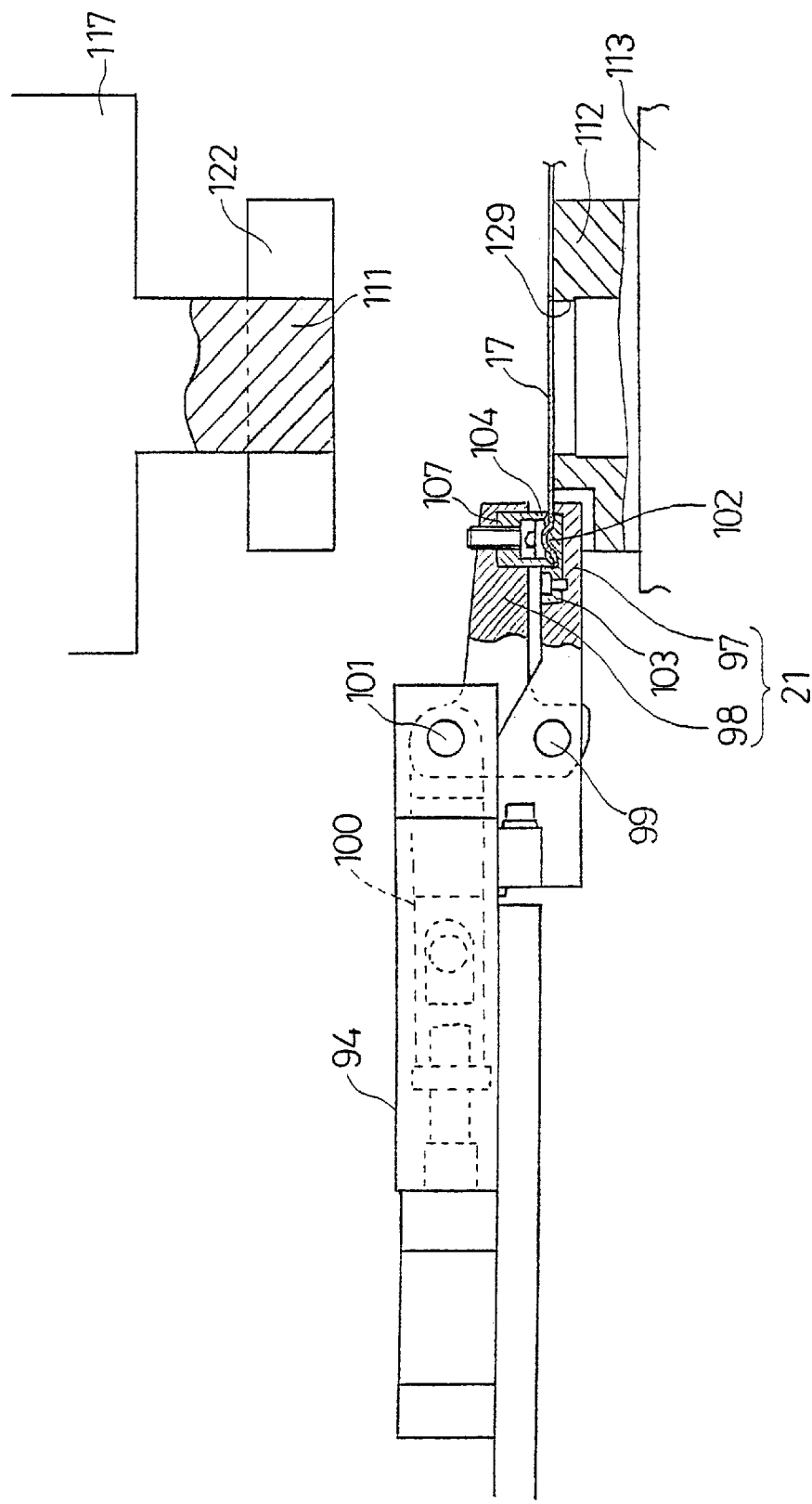
FIG. 12 is a partially cutaway front view showing the relative positions of chuck tools and punching tools, in a state where a large thin sheet in the aforementioned thin sheet punching device has been moved to a final punching position.
Figure 13:
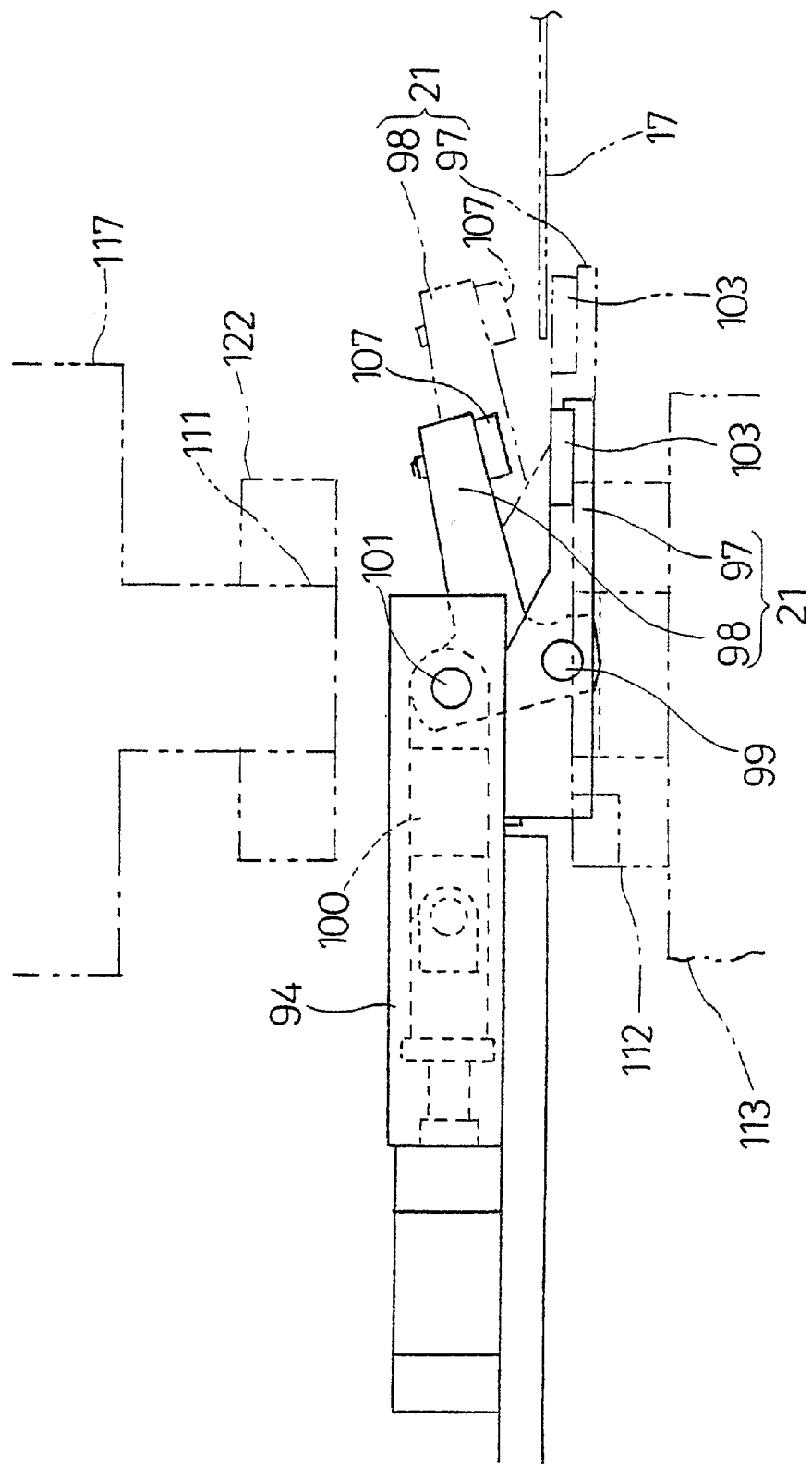
FIG. 13 is a front view showing the relative positions of the aforementioned chuck tools and punching tools in a state where a completely processed large thin sheet has been moved to a release position.

FIG. 12 is a partially cut-away front view showing the relative positions of the chuck tools 21 of the thin sheet movement control mechanism 29 and the punching tool 23 of the punch press machine 30, when the large thin sheet 17 has been moved to its final position for punching. FIG. 13 is a front view showing the relative positions of the chuck tools 21 and the punching tools 23 when the large thin sheet 17 has been moved to a release position. Referring to FIG. 12, the chuck tools 21 are constituted by a lower fixed jaw 97 disposed horizontally in a chuck holder 94 installed on the installing arm member 90, and an upper moving jaw 98 installed rotatably about a pivot 99 with respect to the fixed jaw 97. The movable jaw 98 is coupled via a coupling axle 101 to an air cylinder 100 providing a driving source for same, which is accommodated inside the chuck holder 94.

A lower jaw mold 103 having an engaging projection 102 which protrudes upwards in a hemispherical shape is fixed by screws to the fixed jaw 97. On the other hand, the movable jaw 98 has a topped cylindrical shape having an internal diameter which allows the engaging projection 102 to be inserted therein, and an upper jaw mold 107, the lower opening portion of which forms a sharp toothed section 104, is fixed by screws thereto in a position opposing the lower jaw mold 103. Accordingly, by gripping a large thin sheet 17 between the lower jaw mold 103 and the upper jaw mold 107, the chuck tool 21 causes the large thin sheet 17 to undergo plastic deformation upwards in the hemispherical shape of the engaging projection 102, by means of the pressure of the toothed section 104, and the large thin sheet 17 is held securely between the upper jaw mold 107 and the lower jaw mold 103, in a state where the toothed region 104 bites into the region surrounding the deformation. In other words, although the large thin sheet 17 is of relatively large size and heavy weight, even when moved at high speed, it is gripped by the chuck tools 21 in a securely held state which does not allow the sheet to deviate from its prescribed registered position.

Next, the operation of controlling the movement of the large thin sheet 17 by means of the aforementioned thin sheet movement control mechanism 29 is described. With the thin sheet movement control mechanism 29 in a standby state at the control start end position illustrated in FIG. 10 and FIG. 11, when the positional registration of the large thin sheet 17 in the material supply/position registering area 34 by means of the thin sheet positioning mechanism 28 is completed as described above, the thin sheet movement control mechanism 29 starts to move towards the material supply/position registering area 34 by means of the X direction movement control servo motor 39 rotating in the forward direction, and it halts at the end position indicated by the finish end limit member 93. Thereupon, the pair of chuck tools 21, with the upper jaw mold 107 rotated upwards into a release position, as indicated by the double-dotted lines in FIG. 13, pass by the punching tools 23 of the punch press machine 30 and are accurately located with respect to a prescribed position in the clamping margin 22 of the large thin sheet 17. Incidentally, the composition of the punching tools 23 which allows the chuck tools 21 to pass by in this way is described hereinafter.

In the thin sheet movement control mechanism 29 which is halted at the finish position, the air cylinder 100 is driven and the upper jaw mold 107 is caused to rotate downwards, whereby the chuck tools 21 securely grip the large thin sheet 17 by means of the upper and lower jaw molds 107, 103, in the manner described above. In this case, the large thin sheet 17 is fixed in a state where it has been accurately registered in position by the thin sheet positioning mechanism 28, and the thin sheet movement control mechanism 29 is halted accurately in a prescribed gripping position by means of the X direction movement control servo motor 39, which is subjected to feedback control. Therefore, although the large thin sheet 17 is not provided with reference holes for gripping, it can be held by the chuck tools 21 in the prescribed relative position, in an accurate manner.

Once the reference position stopper members 37, 38 and the pushers 35, 36 have been withdrawn respectively to their retracted positions and their hold of the large thin sheet 17 has been released, the thin sheet movement control mechanism 29 which has gripped the large thin sheet 17 by means of the pair of chuck tools 21 drags and transports the large thin sheet 17 by means of reverse rotation of the X direction movement control servo motor 39, and it returns to the control start position delimited by start end limit member 92, where it halts temporarily. At this stage, since the thin sheet movement control mechanism 29 is moved accurately through a prescribed distance by means of the X direction movement control servo motor 39, the large thin sheet 17 transported into the thin sheet movement control area 81 is registered in a position whereby nine of the print patterns 18 in the first row, as shown in FIG. 2, correspond accurately to the respective punching tools 23. In this state, the punch press machine 30 is driven and the nine print patterns 18 on the large thin sheet 17 corresponding to the punching tools 23 are punched out. The punch press machine 30 is described in more detail hereinafter.

Thereupon, by driving the Y direction movement control servo motor 89 by a prescribed amount in the forward direction, the pair of chuck tools 21 are moved in the Y direction by a prescribed movement pitch, via the installing arm member 90 and the carriage 84, and are displaced from the positions indicated by the solid lines in FIG. 10 to the positions. indicated by the double-dotted lines. This movement pitch in the Y direction matches the pitch at which the print patterns 18 are formed in the Y direction. Therefore, the large thin sheet 17 is registered accurately in position in such a manner that the remaining nine print patterns 18 in the first row are opposing the respective punching tools 23, and in this registered state, the punch press machine 30 is driven and the remaining nine print patterns 18 in the first row are punched out.

Thereupon, by driving the X direction movement control servo motor 39 by a prescribed amount in the forward direction, the pair of chuck tools 21 are caused to move in the X direction towards the punch press machine 30, by a prescribed movement pitch which corresponds to the pitch at which the print patterns are formed on the large thin sheet 17 in the vertical direction. Thereby, the large thin sheet 17 is registered in position in a state where nine of the print patterns 18 in the second row are opposing the punching tools 23, and in this registered state, the punch press machine 30 is driven and the nine print patterns 18 in the second row are punched out.

Further, by now driving the Y direction movement control servo motor 89 in the opposite direction by a prescribed amount, the pair of chuck tools 21 are moved by a prescribed movement pitch in the Y direction, and the large thin sheet 17 is registered in a position where the remaining nine print patterns 18 in the second row thereof are opposing the punching tools 23. In this registered state, the punch press machine 30 is driven and the remaining nine print patterns 18 in the second row are punched out. Thereupon, the pair of chuck tools 21 are moved by a prescribed movement pitch in the X direction, the large thin sheet 17 is registered in a state where nine of the print patterns 18 in the third row thereof are opposing the punching tools 23, and the punch press machine 30 is driven in this registered state, thereby punching out the aforementioned nine print patterns 18 in the third row.

Thereafter, a similar operation is repeated, the respective print patterns 18 on the large thin sheet 17 being punched out successively, nine at a time in a single driving action of the punch press machine 30, and when the chuck tools 21 have moved to the final punching position illustrated in FIG. 12, nine print patterns 18 in the last row of the large thin sheet 17 from the front thereof are registered in position opposing the punching tools 23. In this registered state, the punch press machine 30 is operated for the 39th time, whereupon, the large thin sheet 17 is then moved by a prescribed movement pitch in the Y direction and the punch press machine 30 is operated for the 40th time, whereupon the punching process for all of the 360 print patterns 18 on the large thin sheet 17 is completed.

Since the respective servo motors 39, 89 in the thin sheet movement control mechanism 29 described above are driven and controlled with high precision by the programmed control of a controller device, in contrast to situations where the large thin sheet 17 is moved and controlled by operating a chuck or X–Y table, or the like, by driving means, such as cylinders, or the like, here, the large thin sheet 17 can be moved and controlled accurately and swiftly by respective movement pitches in the X direction and Y direction. Specifically, in controlling the movement of the large thin sheet 17 by means of the servo motors 39, 89, it is possible to achieve high-precision positional registration with an error of ±0.01 mm. Moreover, by means of a lower jaw mold 103 having a hemispherical engaging projection 102 and an upper jaw mold 107 having a toothed section 104, the chuck tools 21 grip the large thin sheet 17 whilst causing it to undergo plastic deformation and the toothed section 104 bites into the large thin sheet 17, and hence the chuck tools 21 are capable of holding the large thin sheet 17 securely even in cases of high-speed operation, without any possibility of positional deviation. Thereby, in the present thin sheet punching device, it is possible to punch out around the outer shape of print patterns 18 printed previously on a large thin sheet 17, with extremely high accuracy.

Moreover, in this thin sheet punching device, the number of cutting operations performed by a conventional slitter is reduced, and small blank pieces 19 are obtained simply by punching a large thin sheet 17, thereby greatly simplifying the manufacturing steps involved. In addition to this, nine print patterns 18 can be punched out simultaneously by a single operation of the punch press machine 30, and therefore the productivity rate for small blanks 19 is dramatically improved. Moreover, in the present thin sheet punching device, (a) because each alternate print pattern 18 is punched out, a pulling force only acts in a single direction on the punch margin 20, which is supported by a stripper in the punch press machine 30 (described hereinafter), despite the fact that nine print patterns 18 are punched out simultaneously; (b) the large thin sheet 17 is registered accurately in position with respect to the punching tools 23 as described above; and (c) the large thin sheet 17 can be gripped securely with no positional deviation by the chuck tools 21, whereby it is possible to set the punch margin 20 between the print patterns 18 on the large thin sheet 17 to the smallest possible width, namely, 1.0 mm–0.4 mm. Therefore, the material waste 17a remaining after punch processing of the large thin sheet 17 is a lattice of 1.0 mm–0.4 mm width, which represents a dramatic reduction compared to conventional methods.

At the time that the thin sheet movement control mechanism 29 has stopped moving the large thin sheet 17 towards the control start position, the first reference position stopper members 37 are raised to their registration reference positions. As illustrated in FIG. 7 and FIG. 8, on these first reference position stopper members 37, a guide surface 108 angled at a descending gradient in the movement direction of the large thin sheet 17 being punch processed is formed on the opposite side to the position restricting face, with respect to the large thin sheet 17.

Consequently, when the large thin sheet 17 being punched processed by the punching tools 23 of the punch press machine 30, whilst being moved and controlled by the thin sheet movement control mechanism 29, the material waste 17a remaining after punching of the large thin sheet 17 first rubs against the aforementioned guide surface 108 and is guided in a downward direction, whereupon it is directed along a chute plate 109 and into a waste recovery area 110 provided beneath the material supply/position registering area 34. After the chuck tools 21 have moved to the final punching position in FIG. 12 and the final punching operation has been carried out, they then pass by the punching tools 23 and move to the start position illustrated by the solid lines in FIG. 13, whereupon they are opened and the material waste 17a drops under its own weight into the waste recovery area 110. When the chuck tools 21 have opened to release the material waste 17a, they are advanced, still in their open state, to the gripping position indicated by the double-dotted lines in FIG. 13, where they grip a large thin sheet 17 registered in position by means of the thin sheet positioning mechanism 28.

Next, the punch press machine 30 will be described. As indicated by the general external views in FIG. 7 and FIG. 8, this punch press machine 30 comprises nine sets of press punching tools 23, each set consisting of a punch (upper mold) 111 and a die (lower mold), the nine dies 112 being installed in prescribed positions in a die holder 113, as described hereinafter, and the punches 111 being attached to a punch plate 117, which is fixed to a punch holder 114 in a prescribed position opposing the dies 112. Moreover, a stripper 122 which is pressed against the dies 112 for providing the punch margin 20 in the large thin sheet 17 is installed on the punch plate 117 in a suspended state. In the present embodiment, a 4-post under-drive type of punch press machine 30 is described. Specifically, the punch holder 114 is affixed to a shank 118, which is caused to move up and down by means of four posts 119 (evident in FIG. 1) operated by receiving driving force from a lifting drive mechanism 121 provided inside the main body of the press 120.

Figure 14:
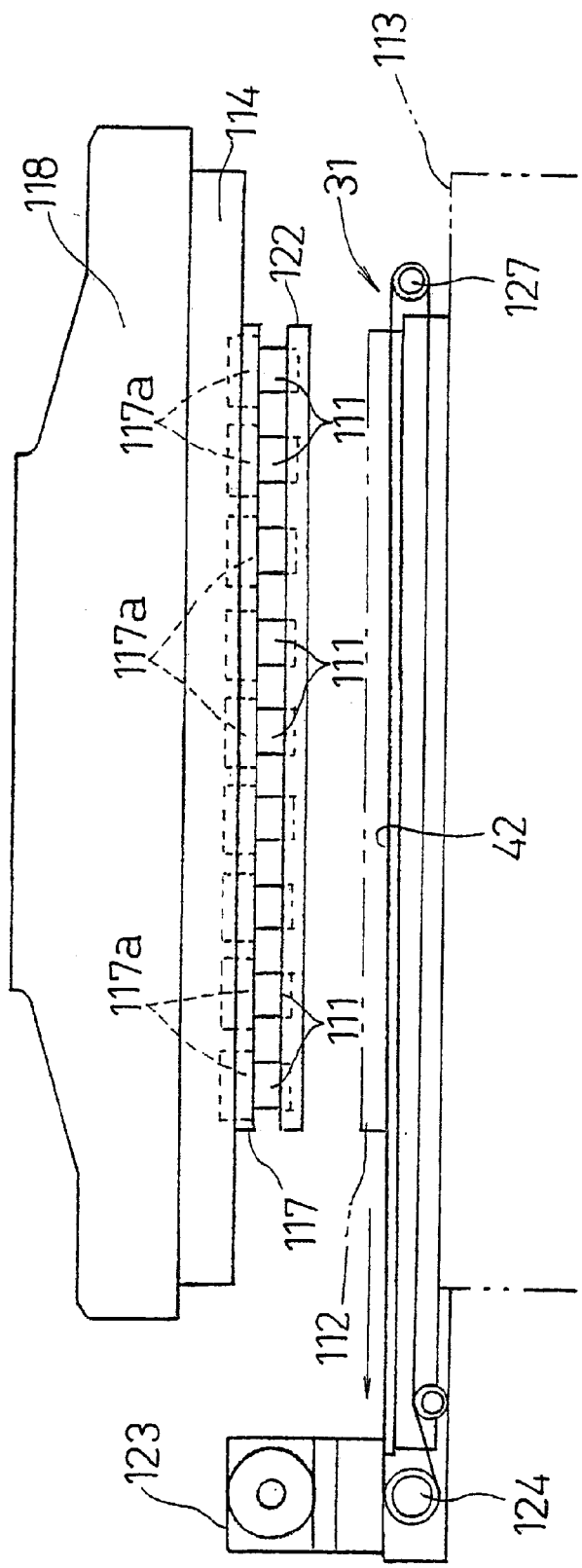
FIG. 14 is a left-hand side view of FIG. 1 showing the upper mold portion of the punch press machine and an output magnet conveyor in a small blank piece transporting mechanism, in the aforementioned thin sheet punching device.

FIG. 14 is a left-hand side view of FIG. 1, showing the upper mold portion of the punch press machine 30 and the output magnetic conveyor 42 in the small blank piece transporting and arranging mechanism 31. The nine punches 111 are each square pillar-shaped members having outer dimensions slightly smaller than the outer dimensions of the approximately square-shaped print patterns 18 provided on the large thin sheet 17. These nine punches 111 are disposed accurately in an alignment pitch equal to the pitch at which alternate print patterns 18 are formed in each lateral row on the large thin sheet 17, and they fit respectively into nine installing sections 117a provided in the punch plate 117 and are fixed to same by fixing screws (not illustrated). Even if the punches 111 become worn, by removing and regrinding them, they can be used for a long period of time. Since each of the punches has the same shape and is installed in the same configuration in this way, they are mutually interchangeable and have good maintenance characteristics.

The output magnetic conveyor 42 is located in a position below the dies 112 in the lower mold section, in such a manner that it spans between a drive roller 124 which is driven in rotation by a motor 123, and an idle roller 127, and it is caused to travel thereby. The small blank pieces (not illustrated in FIG. 14), which drop down when the respective print patterns 18 in a large thin sheet 17 are punched out by means of the punching tools 23 consisting of the punches 111 and dies 112, are held onto the belt surface of this output magnetic conveyor 42 by magnetic force, and are transported in the same orientation in which they were punch processed, in the direction indicated by the arrow, whereupon at the transport end point corresponding to the drive roller 124, the aforementioned small blanks are discharged by force of inertia onto an intermediate magnetic conveyor.

Figure 15:
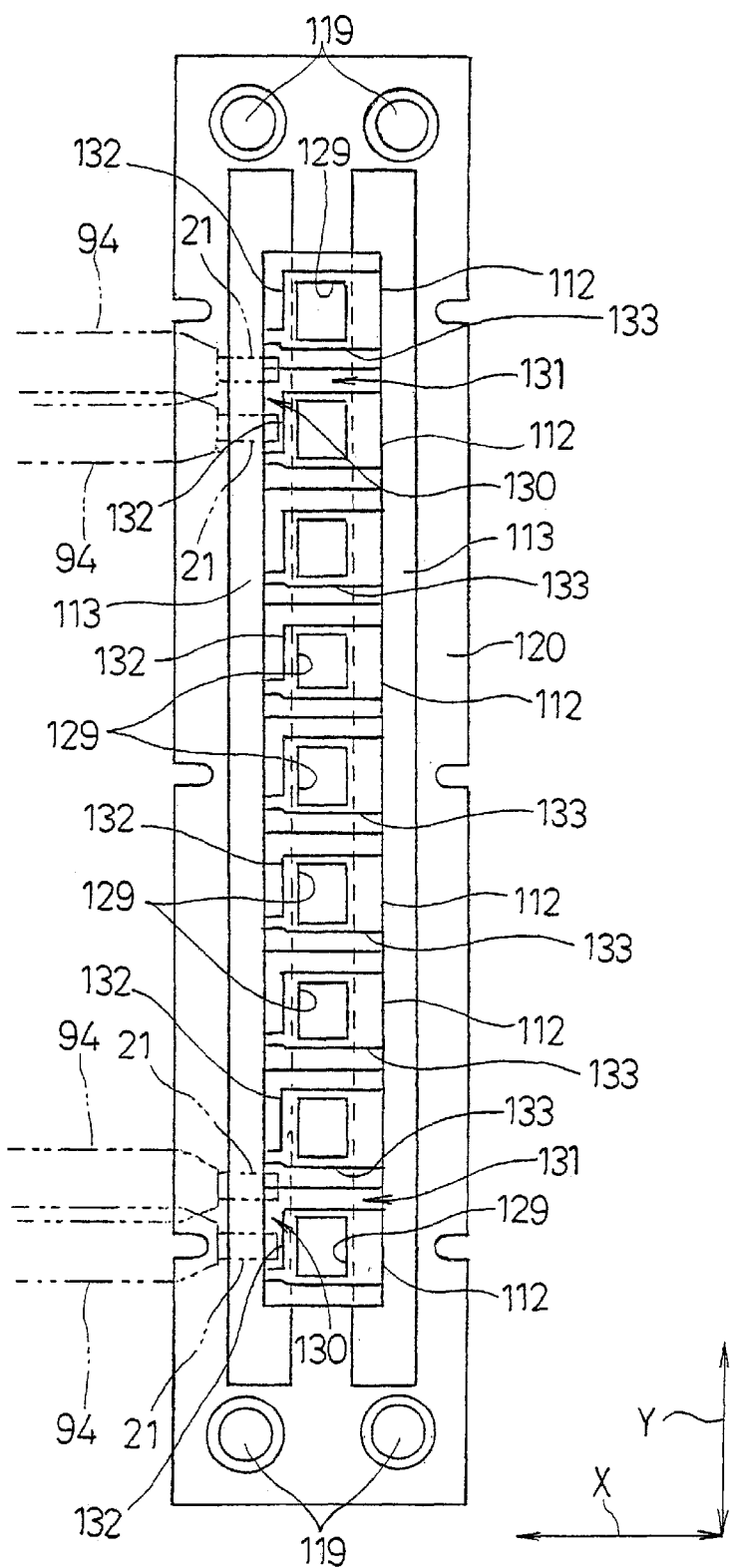
FIG. 15 is a plan view showing the lower mold section of the aforementioned punch press machine.

FIG. 15 is a plan view showing the lower mold section of the punch press machine 30. The nine dies 112 all have the same shape and comprise a punching hole 129 of the same shape as the outer shape of the print patterns 18 on the large thin sheet 17, in the central region of a square outer shape. The nine dies 112 fit respectively into a pair of die holders 113 which are band-shaped in plan view and are fixed in parallel configuration on the press main body 120, in a state whereby they span across opposing positions on each punch 111 in the upper mold section, the dies 112 being fixed thereto by screws (not illustrated).

In the thin sheet punching device according to this embodiment, in order to reduce material waste 17a to a minimum, the clamping margin 22 for gripping the large thin sheet 17 by the pair of chuck tools 21 is set to 25 mm, as illustrated in FIG. 2. Therefore, when punch processing the print patterns 18 in the final row from the front of the sheet, it is necessary to provide escape grooves in the dies 112 for the fixed jaw sections 97 of the chuck tools 21. Moreover, since the chuck tools 21 pass by the dies 112 and are advanced in an open state to the position for gripping the large thin sheet 17, once the punch processing of all the print patterns 18 on the large thin sheet 17 has been completed, it is necessary to provide transit grooves in the dies 112 for the fixed jaw sections 97 of the chuck tools 21. However, due to the correlations between the respective dimensions of the die 112 and the fixed jaw sections 97 of the chuck tools 21, it is not possible to form the aforementioned escape grooves and transit grooves in a single die 112.

Therefore, an escape groove 130 for allowing the pair of chuck tools 21 indicated by the double-dotted lines in FIG. 15 to move by a prescribed movement pitch in the Y direction at the final punching position of the large thin sheet 17, and a transit groove 131 for allowing the chuck tools 21 to pass by to the gripping position, are formed integrally with an L-shaped cutaway step section 132 and a linear-shaped cutaway step section 133 provided respectively in a pair of adjacent dies 112. It is sufficient to provide only one pair of the aforementioned escape groove 130 and transit groove 131 corresponding to the pair of chuck tools 21, but in the present embodiment, similarly shaped L-shaped cutaway step sections 132 and linear-shaped cutaway step sections 133 are respectively provided on either side of all the dies 112, as illustrated in FIG. 15.

In other words, each of the nine dies 112 has the same shape, comprising a punching hole 129, an L-shaped cutaway step section 132 and a linear cutaway step section 133, in the same configuration, and between each pair of adjoining dies 112, there are formed an escape groove 130 and a transit groove 131 which respectively integrate the L-shaped cutaway step section 132 and linear cutaway step section 133. The ones of these escape grooves 130 and transit grooves 131 which do not correspond to the pair of chuck tools 21 do not contribute in any way to the operation of the chuck tools 21, but the presence of these grooves do not present any particular problem, and the fact that all the dies 112 are similarly shaped means that it is not necessary to prepare a large number of spare parts, which is beneficial in terms of facilitating the management of components. Moreover, if the nine dies 112 are removed as a block for regrinding, periodically, or according to need, then when reinstalling the dies 112 after grinding, it is not necessary to specify the installation position of each die, since all the dies 112 have the same shape and are interchangeable, and therefore the task of installation can be carried out readily and quickly. Consequently, it is only necessary to store a single type of die 112, and moreover, maintenance characteristics are dramatically improved.

Since each of the dies 112 comprises an L-shaped cutaway step section 132 and a linear-shaped cutaway step section 133 of different shapes on either side of a punching hole 129, the dies must be installed in the correct orientation. However, although not shown in the diagrams, by providing a plurality of screw holes for fixing bolts in each die 112 in a symmetrical fashion, and providing a plurality of knock pins in an asymmetrical fashion therein, means for ensuring that the dies 112 cannot be fixed unless they are fitted into the die holders 113 in the prescribed configuration can be achieved, thereby dealing with the problem of installation errors.

Figure 16:
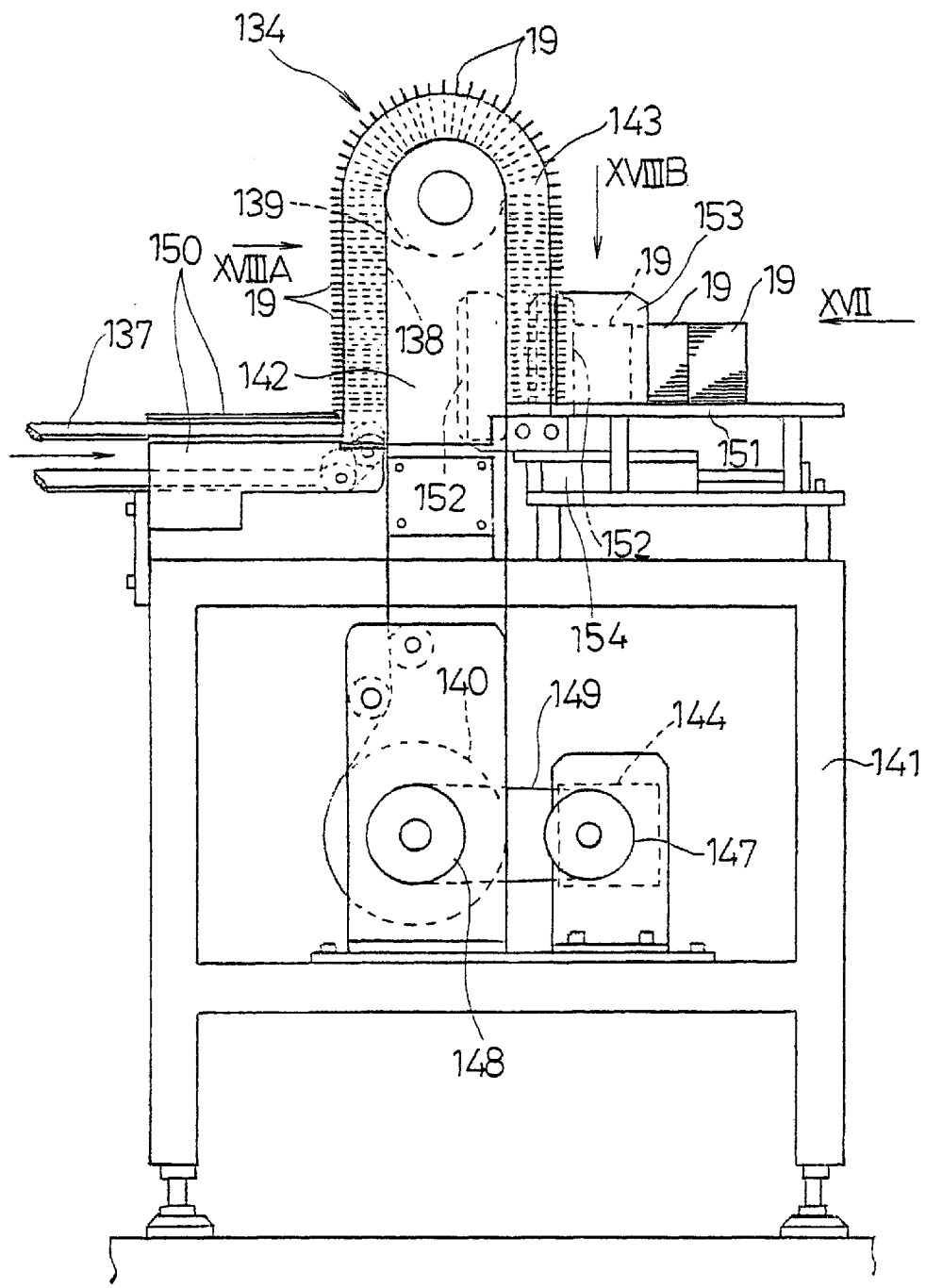
FIG. 16 is a right-hand side view showing a small blank piece aligning and stacking mechanism in the small blank piece transporting and arranging mechanism of the aforementioned thin sheet punching device.
Figure 17:
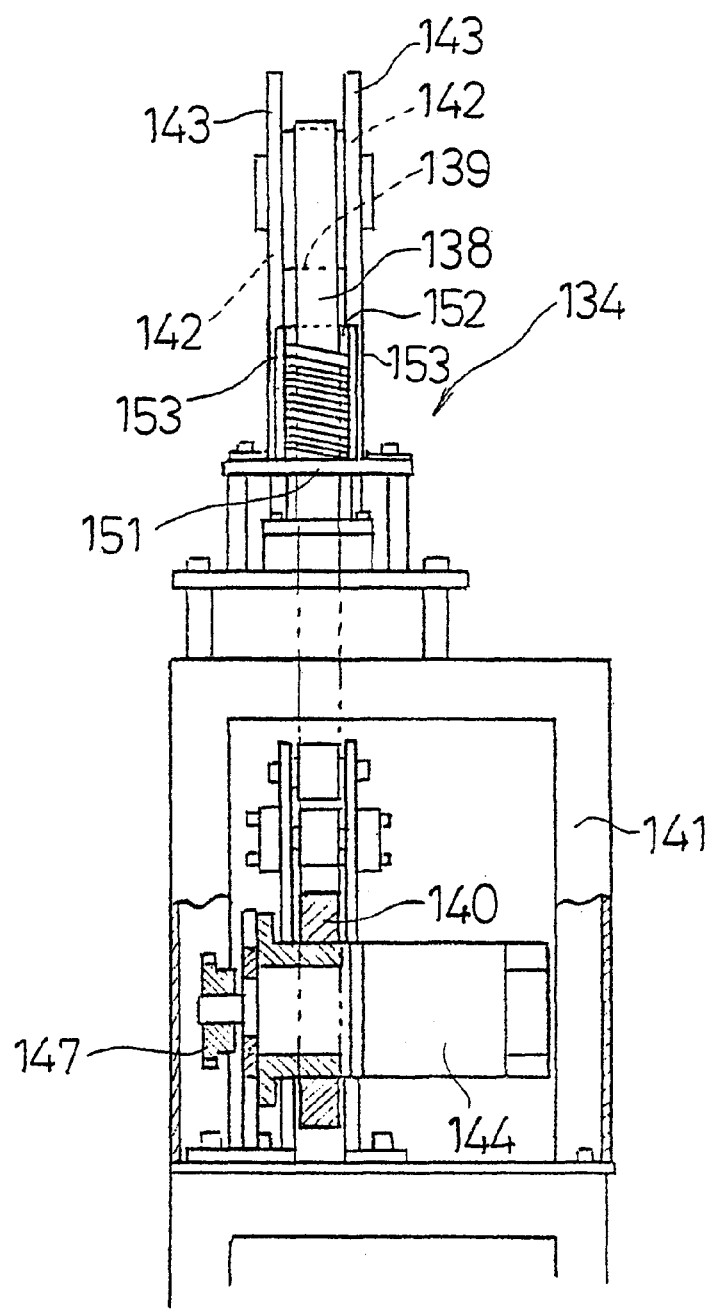
FIG. 17 is a rear view showing the aforementioned small blank piece aligning and stacking mechanism as observed from the direction of arrow XVII in FIG. 16.

FIG. 16 is a right-hand side view showing a small blank piece aligning and stacking device 134 which constitutes the small blank piece transporting and arranging mechanism 31, along with the output magnetic conveyor 42 illustrated in FIG. 1. FIG. 17 is a rear view showing the small blank piece aligning and stacking device 134 as observed from the direction of arrow XVII in FIG. 16. This small blank piece aligning and stacking device 134 constitutes the small blank piece transporting and arranging mechanism 31 by being coupled to the output magnetic conveyor 42 shown in FIG. 1, via an intermediate magnetic conveyor 137.

As revealed in FIG. 16, the aforementioned intermediate magnetic conveyor 137 is positioned such that it rotates in a perpendicular direction to the direction of transport of the small blank pieces 19, as indicated by the arrow, at an inclination of 5–10° with respect to the horizontal plane, and it receives small blank pieces 19 discharged by force of inertia from the transit end of the output magnetic conveyor 42 shown in FIG. 1 and FIG. 14, in an inclined state, and transports them towards the small blank piece aligning and stacking device 134, whilst holding them magnetically.

The small blank piece aligning and stacking device 134 comprises a drive roller 140 provided rotatably inside a main housing 141, and an idle roller 139 provided rotatably on a pair of installation plates 142 set a prescribed distance apart on the upper face of the main housing 141. A stacking magnetic conveyor 138 is attached between the drive roller 140 and the idle roller 139. The inverse U-shaped portions of the aforementioned pair of installation plates 142 projecting beyond the stacking magnetic conveyor 138 form guide sections 143 for the small blank pieces 19 transported by the stacking magnetic conveyor 138. The interval between these two guide sections 143 is set to a distance slightly smaller that the width of the small blank pieces 19 in the perpendicular direction to their direction of conveyance. Consequently, the intermediate magnetic conveyor 137 is set in such a manner that it inclines the small blank pieces 19 to an angle whereby they can be introduced between the pair of guide sections 143 set to the aforementioned small interval.

The stacking magnetic conveyor 138 is caused to travel by means of the rotation of a drive source motor 144 being transmitted to the drive roller 140 via a chain 149 which spans between a drive-side sprocket 147 and an idle-side sprocket 148. The stacking magnetic conveyor 138 is positioned perpendicularly with respect to the intermediate magnetic conveyor 137. Therefore, small blank pieces 19 conveyed in an inclined state by the intermediate magnetic conveyor 137 are held by a pair of guide plates 150 whilst being introduced inbetween the pair of guide sections 143, and they are held by magnetism onto the conveyor belt of the stacking magnetic conveyor 138 in an almost perpendicular position with respect to same, whereupon they are guided vertically upwards with the rotation of the stacking magnetic conveyor 138, and then perform a U turn and are transported vertically downwards. In FIG. 16 and FIG. 17, only the conveyor belts of the intermediate magnetic conveyor 137 and the stacking magnetic conveyor 138 are illustrated, and the magnets thereof are not depicted.

Figures 18A, 18B:
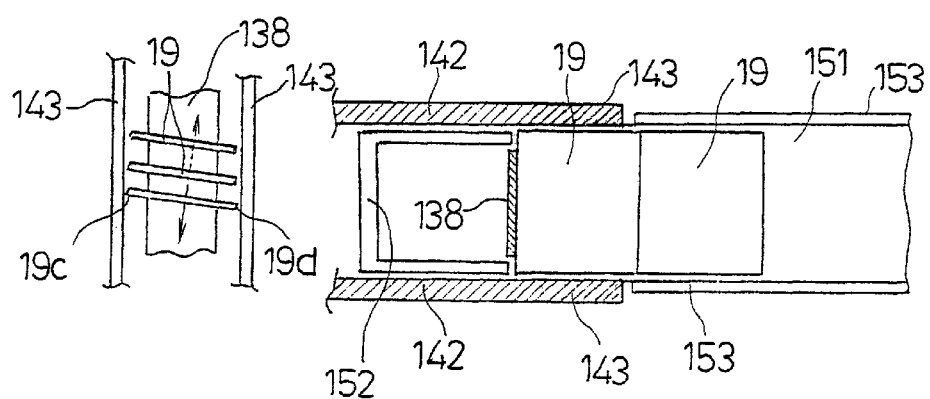
FIG. 18A is an enlarged view in the direction of arrow XVIIIA in FIG. 16
FIG. 18B is an enlarged view in the direction of arrow XVIIIB in FIG. 16.

FIG. 18A shows an enlarged view in the direction of arrow XVIIIA in FIG. 16. When the small blank pieces 19 held by magnetism onto the stacking magnetic conveyor 138 in a perpendicular position with respect thereto are conveyed in an upward vertical direction, they seek to fall downwards as indicated by the solid arrow, but since they have been inserted in an oblique position between the two guide section 143 which are separated by a smaller interval than the width of the small blank pieces 19 in the perpendicular direction to their direction of conveyance, the upper end portions 19c of the small blank pieces 19 in an oblique state confront the corresponding guide section 143 and hence the small blank pieces 19 are prevented from falling. Furthermore, when the small blank pieces 19 are conveyed in a downward vertical direction after performing a U turn with the idle roller 139, they seek to fall downwards in the direction indicated by the double-dotted arrow, but in this case, the end portions 19d on the upper side of the obliquely positioned small blank pieces 19 confront the corresponding guide section 143, thereby preventing them from falling. In other words, by preventing the small blank pieces 19 from falling by means of the two guide sections 143, the small blank pieces 19 are conveyed vertically upwards whilst maintaining a virtually perpendicular positional relationship to the stacking magnetic conveyor 138, whereupon they perform a U-turn and are conveyed vertically downwards.

FIG. 18B shows an enlarged view in the direction of arrow XVIIIB in FIG. 16. A small blank receiving plate 151 is provided in a horizontal position on the upper face of the main housing 141, the front edge thereof being located in the vicinity of the outer surface of the stacking magnetic conveyor 138, in other words, the surface on which the small blank pieces 19 are held. Each of the small blank pieces 19 held magnetically in a virtually perpendicular position on the stacking magnetic conveyor 138 and conveyed vertically downwards by same are prevented from being transported further by the small blank receiving plate 151, and they are stacked sequentially in an aligned state on top of this small blank receiving plate 151.

On the other hand, a small blank expelling member 152 having a square U-shaped form in plan view, the two ends thereof being slightly further apart than the width of the stacking magnetic conveyor 138, is provided on the opposite side of the small blank receiving plate 151 with respect to the stacking magnetic conveyor 138. Each time that 360 small blank pieces 19 corresponding to a single large thin sheet 17 have been stacked up on the small blank receiving plate 151, this small blank expelling member 152 is advanced to a position above the small blank receiving plate 151 as indicated by the double-dotted lines in FIG. 16, by driving of the air cylinder 154 illustrated in FIG. 16 and FIG. 17, and the 360 stacked small blank pieces 19 are expelled by the two end portions thereof to a position outside the guide sections 143. In this process, the stacked small blank pieces 19 slide over the small blank receiving plate 151 whilst maintaining their stacked state, by means of holding plates 153 provided on either side of the small blank receiving plate 151, and the 360 stacked small blank pieces 19 on the small blank receiving plate 151 are thereby expelled outside the device.

More specifically, by means of the small blank piece transporting and arranging mechanism 31 consisting of a output magnetic conveyor 42, an intermediate magnetic conveyor 137 and a small piece aligning and stacking device 134, each of the small blank pieces 19 obtained by punching a large thin sheet 17 can be output in an aligned, stacked and correctly orientated state, 360 pieces at a time, corresponding to a single large thin sheet 17, and this greatly facilitates the processing steps in subsequent stages.

FIG. 19 shows a timing chart from programmed control performed by a controller in the present thin sheet punching device: FIG. 19A shows the movement position of the thin sheet transporting mechanism 27; FIG. 19B shows the respective suction and release states of the suction cups 33; FIG. 19C shows the operational position of the reference position stopper members 37, 38; FIG. 19D shows the operational position of the pushers 35, 36; FIG. 19E shows the open and close state of the chuck tools 21; FIG. 19F shows the movement position of the thin sheet movement control mechanism 29; FIG. 19G shows the operational state of the punch press machine 30; and FIG. 19H shows the operational state of the small blank piece expelling member 152. The respective reference numerals of the various mechanisms and members involved are used accordingly in FIG. 19A–FIG. 19H.

For the sake of convenience, FIG. 19 shows a state at the start of operation of the thin sheet punching device. Once an operator has set a pallet 48 bearing a stacked plurality of large thin sheets 17 onto the thin sheet setting table 24, and then operated the operating panel (not illustrated) of the thin sheet punching device, at time t1, the thin sheet transporting mechanism 27, which is in a halted state at a front end position corresponding to the thin sheet setting table 24 as shown in FIG. 19A, lowers the suction cups 33 as shown in FIG. 19B, and picks up by vacuum suction the front end portion of the uppermost large thin sheet 17 on the pallet 48.

Thereupon, at time t2, the thin sheet transporting mechanism 27 starts to convey the large thin sheet 17 towards the material supply/position registering area 34, as shown in FIG. 19A. At this stage, in the thin sheet movement control mechanism 29 represented in FIG. 19F, the chuck tools 21 are in a release position as illustrated by the solid lines in FIG. 13. Therefore, the chuck tools 21 are in an open state as illustrated in FIG. 19E. In this embodiment, after the final punch processing step of the previous large thin sheet 17, the thin sheet punching device halts operation in a state where the chuck tools 21 remain in an open position after having released the material waste 17a from the large thin sheet 17. However, the operational steps of the thin sheet punching device are not limited to this.

Next, at time t3, when the thin sheet transporting mechanism 27 has finished conveying the large thin sheet 17 to a rear end position opposing the material supply/position registering area 34, as illustrated in FIG. 19A, the suction cups 33 release their vacuum hold, as in FIG. 19B, and deposit the large thin sheet 17 onto the material supply/position registering area 34. Immediately thereafter, at time t4, firstly, the first and second reference position stopper members 37, 38 start to rise to their prescribed reference positions, as shown in FIG. 19C, and at time t5 when both the reference position stopper members 37, 38 have reached these reference positions, the first and second pushers 35, 36 start to advance, as shown in FIG. 19D, and push the large thin sheet 17 on the material supply/position registering area 34 against the respective reference position stopper members 37, 38. Thereby, the large thin sheet 17 is accurately registered in position on the material supply/position registering area 34.

Next, at time t6 when the large thin sheet 17 has been registered in position, the thin sheet movement control mechanism 29 which is halted in a release position with the chuck tools 21 in an open state moves forwards towards the gripping position, as shown in FIG. 19F, and when the chuck tools 21 reach the gripping position at time t7, the chuck tools 21 close and grip the clamping margin 22 of the large thin sheet 17, as shown in FIG. 19E. At the timing that the chuck tools 21 grip the large thin sheet 17, the two reference position stopper members 37, 38 are withdrawn to their downward retracted positions, as shown in FIG. 19C, and the two pushers 35, 36 are withdrawn to their rearward retracted positions, as shown in FIG. 19D. Thereby, the positional fixing of the large thin sheet 17 by the two reference position stopper members 37, 38 and the two pushers 35, 36 is released, and at time t8 immediately thereafter, the thin sheet movement control mechanism 29 starts to drag the large thin sheet 17 gripped by the chuck tools 21 towards the control start position.

With regard to the thin sheet transporting mechanism 27 as illustrated in FIG. 19A, on the other hand, at time t9 after the two reference position stopper members 37, 38 and the two pushers 35, 36 have been withdrawn respectively to their retracted positions in order to release the fixing of the large thin sheet 17 in the registered state, the thin sheet transporting mechanism 27 starts to move towards the thin sheet setting table 24, virtually simultaneously with the time at which the thin sheet movement control mechanism 29 starts to move to the start position.

When the thin sheet movement control mechanism 29 reaches, and halts at, the control start position at time t10 as illustrated in FIG. 19F, at that time, the large thin sheet 17 will be registered in a position wherein nine alternate print patterns 18 in the first row thereof accurately match the punching holes 129 of the respective dies 112. At time t10, the first and second reference position stopper members 37, 38 are raised towards their registration reference positions. This serves to guide the material waste 17a generated by the subsequent punch processing of the large thin sheet 17 into the waste recovery area 110, by means of the guide faces 108 of the first reference position stopper members 37. Consequently, in this case, only the first reference position stopper members 37 needs to be controlled so that they rise to their registration reference position.

Next, at t11 shown in FIG. 19G, after the reference position stopper members 37, 38 have been displaced to their restricting positions, the punch press machine 30 starts operation, and as shown in FIG. 19F, movement control towards the final punching position is initiated, whereby, each time nine print patterns 18 are punched out by the punch press machine 30, the large thin sheet 17 is moved in either direction of the Y axis by a prescribed movement pitch, whereupon it is moved in the X direction by a prescribed movement pitch. At time t12 immediately after the punch press machine 30 has started operation, the thin sheet transporting mechanism 27 reaches the suction position over the thin sheet setting table 24 and waits at standby until the timing for picking up and transporting the next large thin sheet 17. During this time, the small blank pieces 19 punched out of the large thin sheet 17 by the punch press machine 30 are stacked up on the small blank receiving plate 151.

At t12 during the punch processing of the large thin sheet 17, the thin sheet transporting mechanism 27 waiting at standby at a forward position lowers the suction cups 33, and as shown in FIG. 19B, picks up by vacuum suction the front end portion of the uppermost large thin sheet 17 on the pallet 48, whereupon, at t13, it starts to transport the large thin sheet 17 towards the material supply/position registering area 34, as shown in FIG. 19A.

Thereupon, once the thin sheet movement control mechanism 29 has reached the final punching position, as shown in FIG. 19F, and the punch press machine 30 has completed punching of the print patterns 18 in the last row at time t15 shown in FIG. 19G, the thin sheet movement control mechanism 29 is moved again until it reaches the release position, where it halts. Next, the chuck tools 21 are opened, as shown in FIG. 19E, and the material waste 17a remaining after all the punch processing has been completed is expelled towards the waste recovery area 110. Moreover, the reference position stopper members 37, 38 are withdrawn to their lower retracted positions as shown in FIG. 19C, thereby allowing the thin sheet transporting mechanism 27 to pass the next large thin sheet 17. Once the material waste 17a has been discharged by opening the chuck tools 21, the thin sheet movement control mechanism 29 waits temporarily in the release position.

At t18, when the thin sheet transporting mechanism 27 has finished transporting the large thin sheet 17 to a rear end position opposing the material supply/position registering area 34, as shown in FIG. 19A, the suction cups 33 release their vacuum hold as indicated in FIG. 19B, thereby depositing the large thin sheet 17 onto the material supply/position registering area 34. Immediately thereafter, at t19, the first and second reference position stopper members 37, 38 start to rise their prescribed reference positions, as shown in FIG. 19C, and moreover, at t20, the first and second pushers 35, 36 start to advance as shown in FIG. 19D, and the large thin sheet 17 is registered in position on the material supply/position registering area 34. When this positional registration of the large thin sheet 17 is completed, the thin sheet movement control mechanism 29 waiting at standby in the release position with the chuck tools 21 in an open state advances towards the gripping position at t21 shown in FIG. 19F, and at time t22, when the chuck tools 21 have reached the gripping position, they grip hold of the large thin sheet 17, as indicated in FIG. 19E.

When the chuck tools 21 have gripped the large thin sheet 17, the reference position stopper members 37, 38 are withdrawn to their lower retracted positions as shown in FIG. 19C, and the pushers 35, 36 are withdrawn to their lower retracted positions as shown in FIG. 19D. Thereby, since the positional fixing of the large thin sheet 17 by the reference position stopper members 37, 38 and the pushers 35, 36 is released, then at time t23 immediately thereafter, the thin sheet movement control mechanism 29 starts to drag and move the large thin sheet 17 held by the chuck tools 21 towards the start position. The pause interval in punch processing whilst the thin sheet movement control mechanism 29 transports the large thin sheet 17 to the start position is utilized in such a manner that, at t24 during this pause interval, the small blank piece expelling member 152 in the small blank piece transporting and aligning mechanism 31 is driven, as shown in FIG. 19H, and the small blank pieces 19 corresponding to a single large thin sheet 17, which have been stacked on the small blank receiving plate 151, are pushed out from between the guide section 143 to a position between holding plates 153.

Thereafter, similar operations to those described above are repeated and the respective large thin sheets 17 on the pallet 48 are transported one at a time, and the print patterns 18 thereon are punch processed in a continuous manner. In this thin sheet punching device, as described previously, whilst the previous large thin sheet 17 is being punch processed by the punch press machine 30 under the movement control implemented by the thin sheet movement control mechanism 29, the large thin sheet 17 to be processed subsequently is conveyed preliminarily to the material supply/position registering area 34 by the thin sheet transporting mechanism 27, and the chuck tools 21 wait in an open state at a release position in the vicinity of the position for gripping a large thin sheet 17. Therefore, when punch processing has been completed, it is possible to operate the thin sheet movement control mechanism 29 in a virtually continuous manner as can be seen from FIG. 19F, and hence the punch processing of large thin sheets 17 involving a series of steps can be performed in a virtually continuous manner, thereby enabling small blank pieces 19 to be punched out at a very good productivity rate.

Referring to FIG. 19C, it is also possible for only the first reference position stopper members 37 to be raised to their reference positions at timing t10, whilst the second reference position stopper members 38 are advanced to their reference positions once the large thin sheet 17 has been transported and loaded onto the material supply/position registering area 34 by the thin sheet transporting mechanism 27. In this case, the first reference position stopper members 37 remain in their reference positions, rather than being withdrawn, at timing t16, while the positional registration of the large thin sheet 17 on the material supply/position registering area 34 is completed before the chuck tools 21 reach the processing end position. When the reference position stopper members 37, 38 and pushers 35, 36 are retracted, releasing the large thin sheet 17 once it has been gripped by the chuck tools 21, the thin sheet transporting mechanism 27 is then able to move towards the front end position. Thereby, the chuck tools 21 are able to move towards the gripping position immediately after they have opened and released the material waste 17a, and hence the time interval between t17 and t21 in FIG. 19F can be shortened.

INDUSTRIAL APPLICABILITY

As described above, according to the thin sheet punching device of the present invention, the manufacturing process is greatly simplified, and moreover, since a plurality of small pieces can be punched out simultaneously by means of a single operation of the punch press machine, productivity for small pieces is improved dramatically.

Moreover, the material waste remaining after the punching of the large thin sheet has been completed is significantly reduced in comparison to a conventional method. In particular, when obtaining small pieces forming blanks for the outer jackets of batteries by means of punch processing a large thin sheet, a very great economic advantage is obtained by significantly reducing material wastage, since the current production numbers for small-scale batteries are extremely high.

What is claimed is:

1. A thin sheet punching device comprising:
   a table on which a plurality of thin sheets of prescribed dimensions are loaded in a stacked fashion;
   a position registering area connected to the table, in which a thin sheet to be processed is set in position;
   a transporting mechanism for loading the thin sheets one at a time from the table onto the position registering area;
   a positioning mechanism provided in the position registering area for positioning the thin sheet in a predetermined position, comprising pushers for pressing two adjacent edges of the thin sheet in mutually perpendicular directions, and a first stopper member and a second stopper member, against which the two opposing edges of said thin sheet are pressed;
   a processing area connected to the position registering area, in which the thin sheet is processed;
   a movement control mechanism provided in the processing area, having a plurality of chuck tools for transferring the thin sheet from the position registering area into the processing area and for controlling the overall movement of the thin sheet during the processing thereof; and
   a punch press machine disposed along one side of the processing area and provided with a plurality of press punching tools aligned in a row along a longitudinal direction of said punch press machine, each of said press punching tools comprising a die and a punch, for simultaneously punching out a plurality of alternate punching locations of a plurality of punching locations set in a row in the thin sheet; wherein
   the thin sheet is moved in two mutually perpendicular directions, a first direction being parallel to the longitudinal direction of the punch press machine and a second direction being orthogonal thereto, and
   the movement control mechanism alternately effects control for moving the thin sheet reciprocally by a prescribed movement pitch in the first direction, and control for moving the thin sheet by a prescribed movement pitch in the second direction each time it has been moved in either way in the first direction, in such a manner that the plurality of alternate punching locations of the plurality of punching locations set in a row in the first direction of the thin sheet are successively positioned opposite the row of said press punching tools.

2. The thin sheet punching device according to claim 1, wherein an uppermost one of the thin sheets stacked on the table is loaded into the position registering area from one direction thereof parallel to said first direction;
   upon completion of the positioning of the thin sheet in the position registering area, the thin sheet is entirely drawn out from the position registering area into the processing area in a direction parallel to said second direction; and
   the thin sheet is successively fed toward the punch press machine by the prescribed movement pitch in the second direction, a rear edge of the thin sheet being gripped by the chuck tools.

3. The thin sheet punching device according to claim 2, wherein the plurality of chuck tools each comprise a fixed jaw section formed with a chuck surface and an engaging projection protruding from said chuck surface, and a movable jaw section having a sharp toothed section formed at the front end portion of a cylindrical shape capable of containing said engaging projection therein, said movable jaw section being provided in such a manner that it can be moved reciprocally with respect to said fixed jaw section.

4. The thin sheet punching device according to claim 3, wherein a portion of the thin sheet inserted between the fixed jaw section and the movable jaw section is caused to undergo plastic deformation into a shape corresponding to that of the engaging projection by means of pressure imparted by said toothed section, whilst the region surrounding this deformed portion is held between said toothed section of the movable jaw section and said chuck surface of the fixed jaw section.

5. The thin sheet punching device according to any one of claims 1 to 3, wherein the movement control mechanism comprises program-controlled servo motors for the movement in both of the first and second directions.

6. The thin sheet punching device according to any one of claims 1 to 3, wherein a punch margin having a width of 1.0 mm–0.4 mm is set between each two adjacent punching locations on the thin sheet.

7. The thin sheet punching device according to claim 2, wherein the transporting mechanism is provided with a plurality of suction cups for successively picking up only the uppermost sheet of the plurality of thin sheets on the table, and
   the table comprises a plurality of free-moving balls provided in a rotatable fashion, and a receiving plate provided movably on said free-moving balls, which moves reciprocally between a setting position and a suction position where the receiving plate abuts against said transporting mechanism.

8. The thin sheet punching device according to claim 2, wherein the first stopper member is operably connected to an actuator so as to be raised to a registration reference position and to be lowered to a retracted position, the first stopper member being located in said registration reference position when the thin sheet is being registered in the position registering area, and when the thin sheet is being punch processed by the punch press machine.

9. The thin sheet punching device according to claim 8, wherein the first stopper member comprises a position restricting face on which the thin sheet is abutted, and a guide face formed on the opposite side to said position restricting face; and as the thin sheet is fed in the second direction toward the punch press machine, material waste generated after the thin sheet has been punch pressed slides against said guide face of the first stopper member and is guided into a waste recovery area set below the position registering area.

10. The thin sheet punching device according to claim 2, wherein each of said plurality of dies in the punch press machine has a punching hole formed in the central region thereof having a shape corresponding to small pieces to be punched out from the thin sheet; an L-shaped cutaway step section on one side of said punching hole; and a linear-shaped cutaway step section formed on the opposite side of said punching hole, each of said dies being affixed to a die holder in the same installation configuration.

11. The thin sheet punching device according to claim 10, wherein said L-shaped cutaway step section of one die is integrated with said linear-shaped cutaway step section of an adjacent die, thereby forming escape grooves permitting the chuck tools to move on the dies by a prescribed movement pitch in the first direction, when a portion of the thin sheet in the closest vicinity of the rear edge thereof that is gripped by the chuck tools is punch processed, and transit grooves permitting said chuck tools to pass through the row of the dies in the second direction.

12. The thin sheet punching device according to claim 11, wherein said alternate control by the movement control mechanism is started at a control start position wherein the alternate punching locations in the first row in the thin sheet are registered in positions opposing the press punching tools, and ended at a final punching position where the chuck tools enter inside said escape grooves of the dies; and when the chuck tools have passed fully through the transit grooves of the dies, material waste generated when punching of the thin sheet has been completed is released by opening said chuck tools, whereupon said chuck tools advance further to a gripping position, where a next thin sheet registered in position on said position registering area is gripped by said chuck tools.

13. The thin sheet punching device according to claim 2, further comprising a small piece transporting and aligning mechanism for transporting small pieces punched out from a thin sheet by the punch press machine and stacking same in an aligned state, said small piece transporting and aligning mechanism comprising:

an output magnetic conveyor for outputting small pieces which drop down after being punched out by said punch press machine, to the exterior of said punch press machine, whilst maintaining the positions thereof after punching;

a stacking magnetic conveyor for guiding small pieces discharged from the end of the path of said magnetic conveyor in an upward vertical direction and then transporting same in a downward vertical direction, said small pieces being held magnetically in a virtually perpendicular position with respect to the surface of the conveyor;

a small piece receiving plate positioned in the vicinity of said magnetic conveyor, which acts to prevent the conveyance of the small pieces and stack them on each other; and a small piece expelling member for expelling a prescribed number of small pieces stacked up on said small piece receiving plate, to the exterior of said small piece receiving plate.

14. The thin sheet punching device according to claim 13, wherein an intermediate magnetic conveyor is positioned between the output magnetic conveyor and the stacking magnetic conveyor in the small piece transporting and aligning mechanism, said intermediate magnetic conveyor being inclined to a prescribed angle with respect to the horizontal plane, in a perpendicular direction to the direction of transport, and a pair of guide sections being provided on either side of the stacking magnetic conveyor, with a space therebetween smaller than the width of the small pieces in the perpendicular direction to their direction of transport being allowed between said guide sections.

* * * * *